(12) United States Patent
Yoshihiro et al.

(10) Patent No.: US 7,027,715 B2
(45) Date of Patent: Apr. 11, 2006

(54) MAGNETIC-TAPE RECORDING APPARATUS, MAGNETIC-TAPE RECORDING METHOD, MAGNETIC TAPE, AND RECORDING MEDIUM

(75) Inventors: Toshitaka Yoshihiro, Kanagawa (JP); Takuro Enomoto, Tokyo (JP); Fumiyoshi Abe, Kanagawa (JP); Tomoo Hayakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1186 days.

(21) Appl. No.: 09/850,981

(22) Filed: May 8, 2001

(65) Prior Publication Data

US 2002/0001150 A1    Jan. 3, 2002

(30) Foreign Application Priority Data

May 10, 2000    (JP)    ............................. 2000-136626

(51) Int. Cl.
*H04N 5/91*    (2006.01)

(52) U.S. Cl. .......................... 386/68; 386/81; 386/124; 360/48

(58) Field of Classification Search .................. 386/68, 386/81, 111, 112, 124; 360/48, 51
See application file for complete search history.

(56) References Cited

U.S. PATENT DOCUMENTS

| 5,631,998 | A | * | 5/1997 | Han ............................. 386/68 |
| 6,028,726 | A | * | 2/2000 | Yanagihara ................... 360/48 |
| 6,108,148 | A | * | 8/2000 | Higurashi et al. ............ 386/81 |
| 6,115,531 | A | * | 9/2000 | Yanagihara ................... 386/67 |
| 6,141,486 | A | * | 10/2000 | Lane et al. .................... 386/68 |
| 6,201,926 | B1 | * | 3/2001 | Yoshida et al. ............... 386/68 |
| 6,339,673 | B1 | * | 1/2002 | Rijckaert ...................... 386/81 |

* cited by examiner

*Primary Examiner*—Vincent F. Boccio
(74) *Attorney, Agent, or Firm*—Frommer Lawrence & Haug LLP; William S. Frommer; Thomas F. Presson

(57) ABSTRACT

Data for variable-speed reading (such as 16-times-faster reading) is distributed and recorded at positions where a trace is to be made during the variable-speed reading. When data recording is performed by an MPEG method, for example, data for generating an I picture is recorded.

12 Claims, 35 Drawing Sheets

MAGNETIC-TAPE RECORDING APPARATUS, MAGNETIC-TAPE RECORDING METHOD, MAGNETIC TAPE, AND RECORDING MEDIUM

BACKGROUND OF THE INVENTION

1. Field of the Invention

The present invention relates to magnetic-tape recording apparatuses, magnetic-tape recording methods, magnetic tapes, and recording media, and more particularly, to a magnetic-tape recording apparatus, a magnetic-tape recording method, a magnetic tape, and a recording medium which (without fail) certainly capture data in variable-speed reading and which record data for displaying acceptable images.

2. Description of the Related Art

Technologies for compressing and recording image data and audio data have been advancing these days. As a low-bit-rate coding method, an Moving Picture Expert Group (MPEG) method is, for example, used.

When image data to which interframe compression has been applied by a low-bit-rate encoding method, such as MPEG2, and which is recorded into a recording medium by a rotating drum is read, if an attempt is made to read at a variable speed, two times or more faster in the positive direction or the normal speed or faster in the reverse direction, since obtained data has no relationship with each other (decoding cannot be performed with obtained data only), such reading at the variable speed cannot be achieved.

There has been proposed a method for allowing variable-speed reading, in which a reading speed is assumed in advance when compressed image data is recorded into a recording medium, and data to be read is recorded at a position where a head traces at the reading speed, separately from image data used for reading at a normal speed.

When the above proposed method is used, the following problems occur. Since the contact (touching) between a rotating head and the recording medium is designed so as to be most appropriate at normal reading (normal-speed reading in the positive direction), a sufficient contact is not obtained especially at the input end or the output end of a track during variable-speed reading. Therefore, the level of a read RF output is reduced and image data is not always obtained.

A trace error occurs against a target trace position due to factors such as bending of a recording track caused by a recording apparatus or a reading apparatus, trace distortion during reading, a recording-track positional shift caused by jitter in a speed servo during recording, and a movement-speed deviation caused by jitter in a phase-lock servo during reading. Therefore, image data is not obtained in some cases.

Image data for variable-speed reading is recorded into a tape serving as a recording medium, with a pattern (pattern corresponding to a reading speed assumed in advance) having a cyclic feature caused by a variable speed. A unit of interleaving is used for error-correcting outer codes. It is difficult during editing, such as connecting recorded images, to obtain an appropriate matching between two types of periodic features, image data for variable-speed reading and interleaving. To obtain matching, the scale of hardware increases and a software load also increases.

SUMMARY OF THE INVENTION

The present invention has been made in consideration of the foregoing conditions. Accordingly, it is an object of the present invention to certainly obtain data during variable-speed reading to display acceptable images, by recording data for variable-speed reading in a distributed manner at positions where a head is to trace during variable-speed reading and by matching an arrangement pattern of recorded data with interleaving.

The foregoing object is achieved in one aspect of the present invention through the provision of a magnetic-tape recording apparatus for recording digital image data into a track on a magnetic tape by a rotating head, including inputting means for inputting the digital image data; extracting means for extracting digital image data for variable-speed reading, from the digital image data input by the inputting means; and recording means for recording digital image data extracted by the extracting means into only a first area positioned at almost the center of the track, or recording the digital image data in a distribution manner into the first area and a second area to be traced during variable-speed reading, positioned in a track located in the vicinity of the track which includes the first area.

Digital image data recorded into the first area may be digital image data read in common in variable-speed reading in the positive direction and in variable-speed reading in the reverse direction.

The magnetic-tape recording apparatus may be configured such that the recording means sets a predetermined number of tracks to one group, and records the digital image data extracted by the extracting means into each of the first area and the second area according to a predetermined pattern in each group.

The recording means may record the digital image data extracted by the extracting means into the magnetic tape by a rotating head having an azimuth which is determined to have a recording magnetization direction close to the arrangement direction of a magnetic material applied to the magnetic tape.

When the digital image data extracted by the extracting means is recorded into tracks having both azimuths, the recording means may record digital image data for a larger-times-faster reading into a track with an azimuth having a recording magnetization direction closer to the arrangement direction of a magnetic material applied to the magnetic tape, and record digital image data for a smaller-times-faster reading into the other track.

The magnetic-tape recording apparatus may be configured such that the recording means generates digital image data for n-times-faster reading, and arranges and records the digital image data at almost the center of each track at an interval of n tracks or 2n tracks, where n is a power of 2, and the arranged digital image data is used during m-times-faster variable-speed reading in the positive direction and in the reverse direction, where m is a power of 2, and during normal-speed reading in the reverse direction.

In the magnetic-tape recording apparatus, n and m may satisfy the relationship of m<n.

The recording means may record digital image data to be recorded into each of the first area and the second area, into each area a plurality of times.

The magnetic-tape recording apparatus may be configured such that the digital image data is formed of a sync block having a predetermined length; and the recording means records the digital image data into each area the plurality of times, with an area corresponding to (L−N) sync blocks being disposed between the data, where N indicates the number of sync blocks to be recorded into the first area or the second area, and L indicates the number of sync blocks which can be captured in the first area and the second area.

The magnetic-tape recording apparatus may be configured such that the recording means specifies one location as a trace target of phase lock servo, arranges the digital image data at the location and at locations positioned therebefore and thereafter where data can be captured, and records the same digital image data the plurality of times such that the value of (L–N) becomes larger as the head is farther from the trace target.

The foregoing object is achieved in another aspect of the present invention through the provision of a magnetic-tape recording method for a magnetic-tape recording apparatus for recording digital image data into a track on a magnetic tape by a rotating head, including an input control step of controlling the input of the digital image data; an extracting step of extracting digital image data for variable-speed reading, from the digital image data input by a process in the input control step; and a recording control step for controlling such that digital image data extracted by the process in the extracting step is recorded into only a first area positioned at almost the center of the track, or the digital image data is recorded in a distribution manner into the first area and a second area to be traced during variable-speed reading, positioned in a track located in the vicinity of the track which includes the first area.

The foregoing object is achieved in still another aspect of the present invention through the provision of a recording medium storing a computer-readable program for a magnetic-tape recording apparatus for recording digital image data into a track on a magnetic tape by a rotating head, the program including an input control step of controlling the input of the digital image data; an extracting step of extracting digital image data for variable-speed reading, from the digital image data input by a process in the input control step; and a recording control step for controlling such that digital image data extracted by the process in the extracting step is recorded into only a first area positioned at almost the center of the track, or the digital image data is recorded in a distribution manner into the first area and a second area to be traced during variable-speed reading, positioned in a track located in the vicinity of the track which includes the first area.

The foregoing object is achieved in yet another aspect of the present invention through the provision of a magnetic tape, wherein digital image data for variable-speed reading is recorded into a first area positioned at almost the center of a track, or the digital image data is recorded in a distribution manner into the first area and a second area to be traced during variable-speed reading, positioned in a track located in the vicinity of the track which includes the first area.

As described above, according to a magnetic-tape recording apparatus, a magnetic-tape recording method, a recording medium, and a magnetic tape of the present invention, digital image data is recorded into only a first area positioned at almost the center of a track, or recorded in a distribution manner into the first area and a second area to be traced during variable-speed reading, positioned in a track located in the vicinity of the track which includes the first area. Therefore, digital image data which allows digital image data sufficient for displaying acceptable images during variable-speed reading to be captured can be recorded.

DESCRIPTION OF THE PREFERRED EMBODIMENTS

Figure 1:
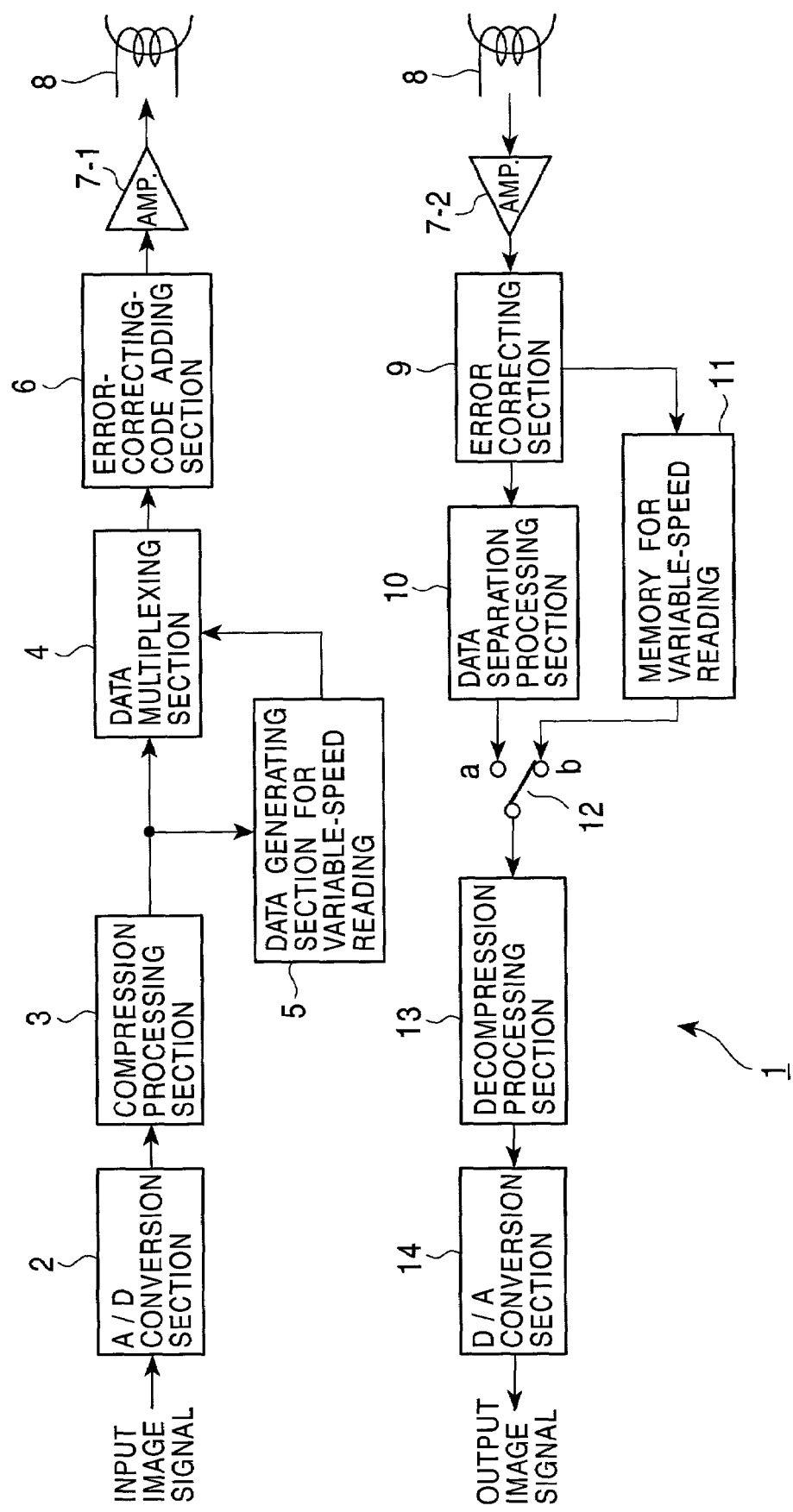
FIG. 1 is a view showing the structure of a recording and reproduction apparatus according to an embodiment of the present invention.

Embodiments of the present invention will be described below by referring to the drawings. FIG. 1 is a view showing the structure of a recording and reproduction apparatus according to an embodiment of the present invention. An image signal output from a video camera (not shown) or others is input to an analog-to-digital (A/D) conversion section 2 of the recording and reproduction apparatus 1. An analog image signal input into the A/D conversion section 2 is converted to digital image data and output to a compression processing section 3. The compression processing section 3 applies compression processing according to a predetermined method to input image data, and outputs it to a data multiplexing section 4 and to a data generating section 5 for variable-speed reading.

When the compression processing section 3 uses an MPEG method for the compression processing, the compression processing section 3 applies discrete cosine transform (DCT) to input image data, performs encoding processing by the MPEG2 method, and outputs compressed image data to the data multiplexing section 4. More specifically, as shown in FIG. 2, when an image signal of 15 frames is compressed, for example, three types of pictures, an I picture, B pictures, and P pictures, are formed after compression.

An I picture is image data generated by compression within a frame, a P picture is image data generated by compression within a frame and with the use of information of the previous frame, and a B picture is image data generated by compression within a frame and with the use of information of the previous and subsequent frames.

Figure 2:
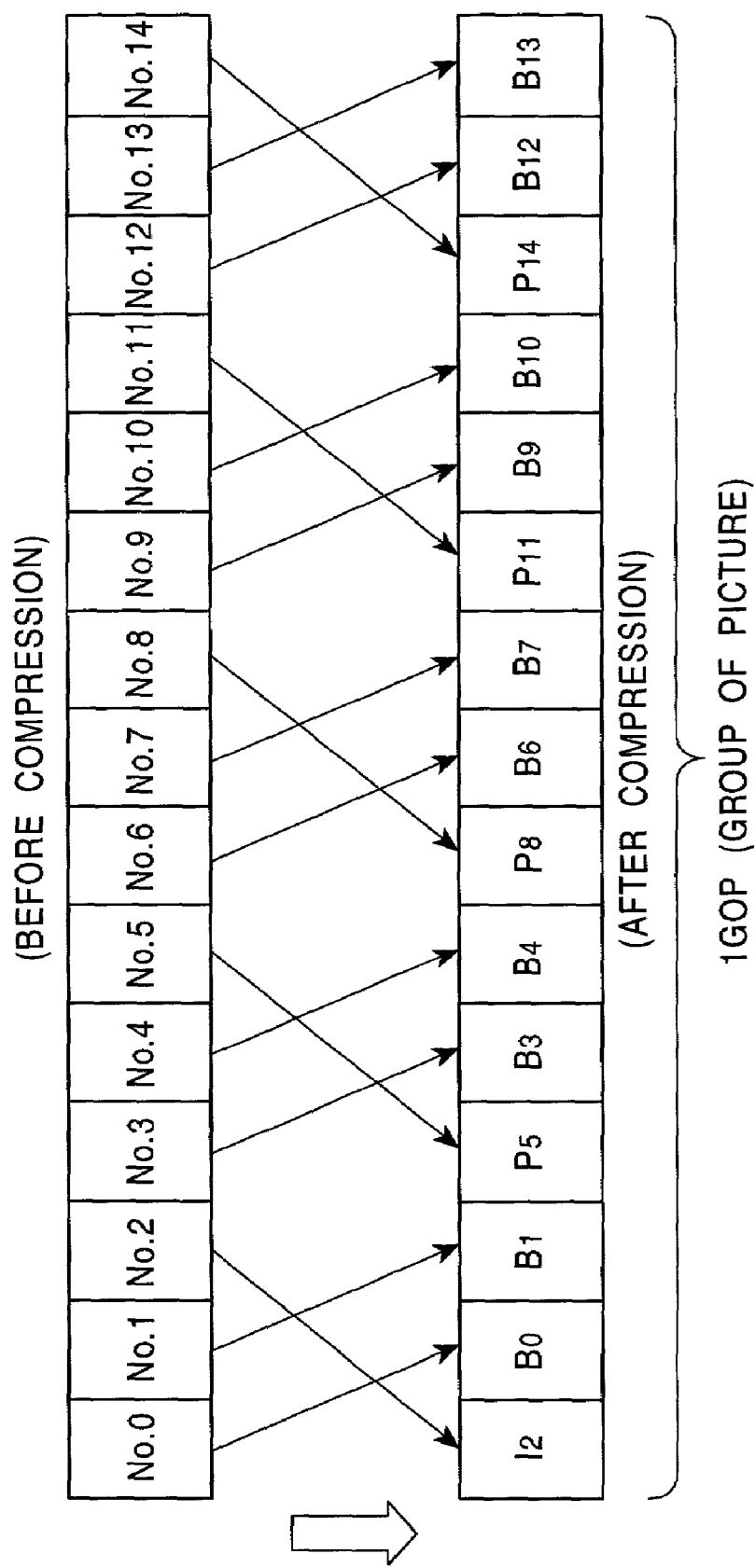
FIG. 2 is a view showing compression.

A data stream formed of an I picture, a P picture, and a B picture and have an arrangement order, such as that shown in FIG. 2, is input into the data multiplexing section 4, multiplexed with another data (such as audio data and system data, including sub-code), and output to an error-correcting-code adding section 6. Data multiplexed by the data multiplexing section 4 includes image data generated by the data generating section 5 for variable-speed reading.

The data generating section 5 uses only I pictures among the image data output from the compression processing section 3 to generate image data for variable-speed reading. As described above, I pictures are compressed by the use of data within frames, but P pictures and B pictures are compressed also by the use of information of other frames (pictures). This means that P pictures and B pictures can be decoded only when the information of other pictures is read. Since I pictures can be decoded irrespective of the reading conditions of other pictures, they are suited as data read in a condition in which only a part of image data can be read, such as variable-speed reading.

In the error-correcting-code adding section 6, an error-correcting code is added to input multiplexed data and the data is output to a rotating head 8 through an amplifier 7-1. The rotating head 8 records received data on a tape (not shown) serving as a recording medium.

Data recorded into the recording medium, including image data, is read by the rotating head 8, and sent to an error correcting section 9 through an amplifier 7-2. The error correcting section 9 applies error-correcting processing to received data, and outputs to a data separation processing section 10 and to a memory 11 for variable-speed reading. The data separation processing section 10 performs processing reverse to that achieved by the data multiplexing section 4. Specifically, the data separation processing section 10 separates input multiplexed data into image data, audio data, system data, and others.

Among the separated data, the image data is output to a decompression processing section 13. A switch 12 connected to the decompression processing section 13 is connected to a terminal "a" side during a normal reading (normal reading in the positive direction) to send the image data output from the data separation processing section 10 to the decompression processing section 13. The switch 12 is connected to a terminal "b" side during another types of reading (variable-speed reading) to send data stored in the memory 11 for variable-speed reading to the decompression processing section 13.

The memory 11 for variable-speed reading stores image data generated by the data generating section 5 for variable-speed reading. During variable-speed reading, since data is intermittently input into the error correcting section 9, error correction is applied only to inner codes. Image data having inner codes to which error correction has been applied is temporarily stored in the memory 11 for variable-speed reading. There are two methods for reading image data from the memory 11 for variable-speed reading, a method in which reading is performed at a constant interval synchronized with the frame of a read image and a method in which reading is performed when image data of one frame has been stored. Either method may be used.

The decompression processing section 13 applies decompression processing (processing such as decoding by the MPEG method and inverse DCT) to image data input through the switch 12, and outputs through a D/A conversion section 14 to a TV receiver (not shown) serving as a display device.

Figure 3:
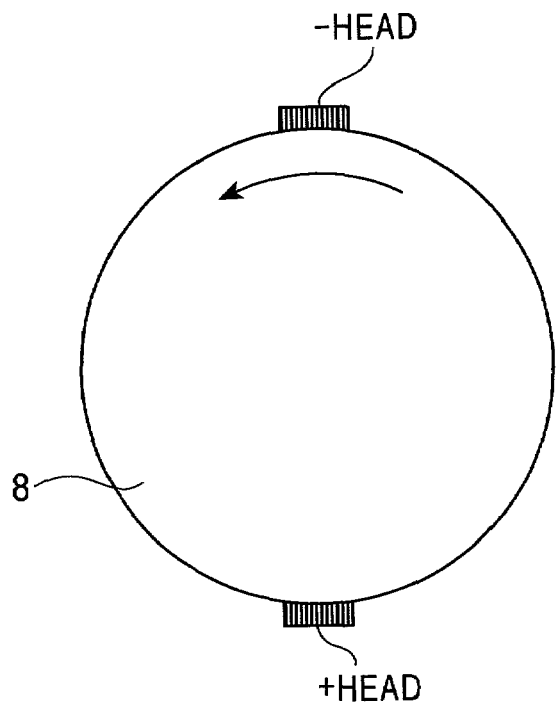
FIG. 3 is a view showing a rotating head.
Figure 4:
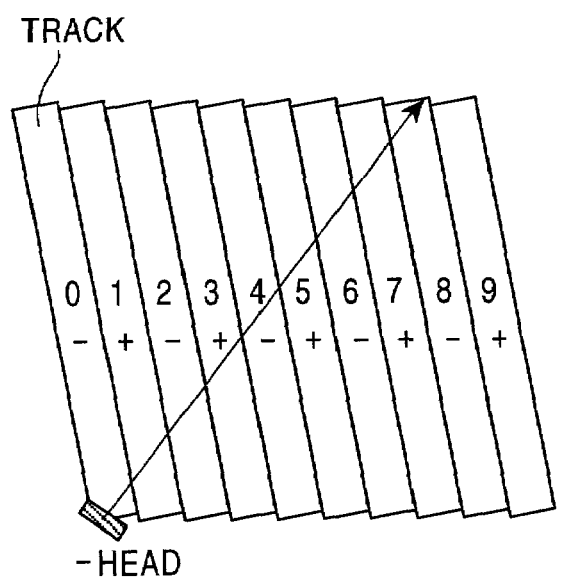
FIG. 4 is a view showing a recording pattern.

It is assumed that the recording and reproduction apparatus 1 has a rotating head 8 having a structure shown in FIG. 3. The rotating head 8 shown in FIG. 3 has two heads which have different Azimuth angles. One head is called a +head, and the other head is called an −head. A recording pattern recorded by the rotating head 8 on a tape serving as a recording medium is shown in FIG. 4. Specifically, tracks are alternately formed by the −head and the +head in a way in which the −head forms track 0, the +head produces track 1, and the −head makes track 2, and so on.

Figure 5:
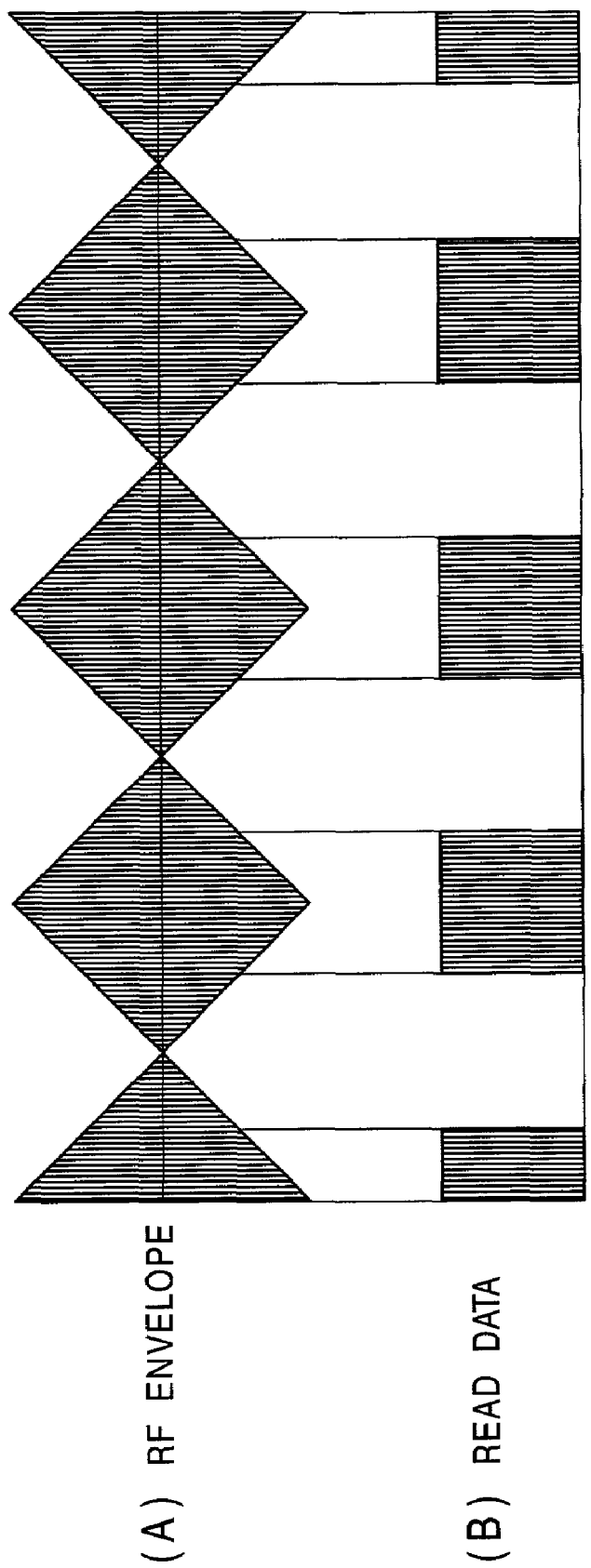
FIG. 5 is a view showing the relationship between an RF-signal envelope and read data.

During nine-times-faster (9×) reading, the −head reads a predetermined part of data from track 0 to track 8. FIG. 5(A) shows the envelope of an RF signal obtained during 9× reading, and FIG. 5(B) shows demodulated read data obtained, for example, when data having an output-level reduction of up to 6 dB is demodulated. As shown in FIG. 5(B), data read during variable-speed reading has intermittent data strings.

Figure 6:
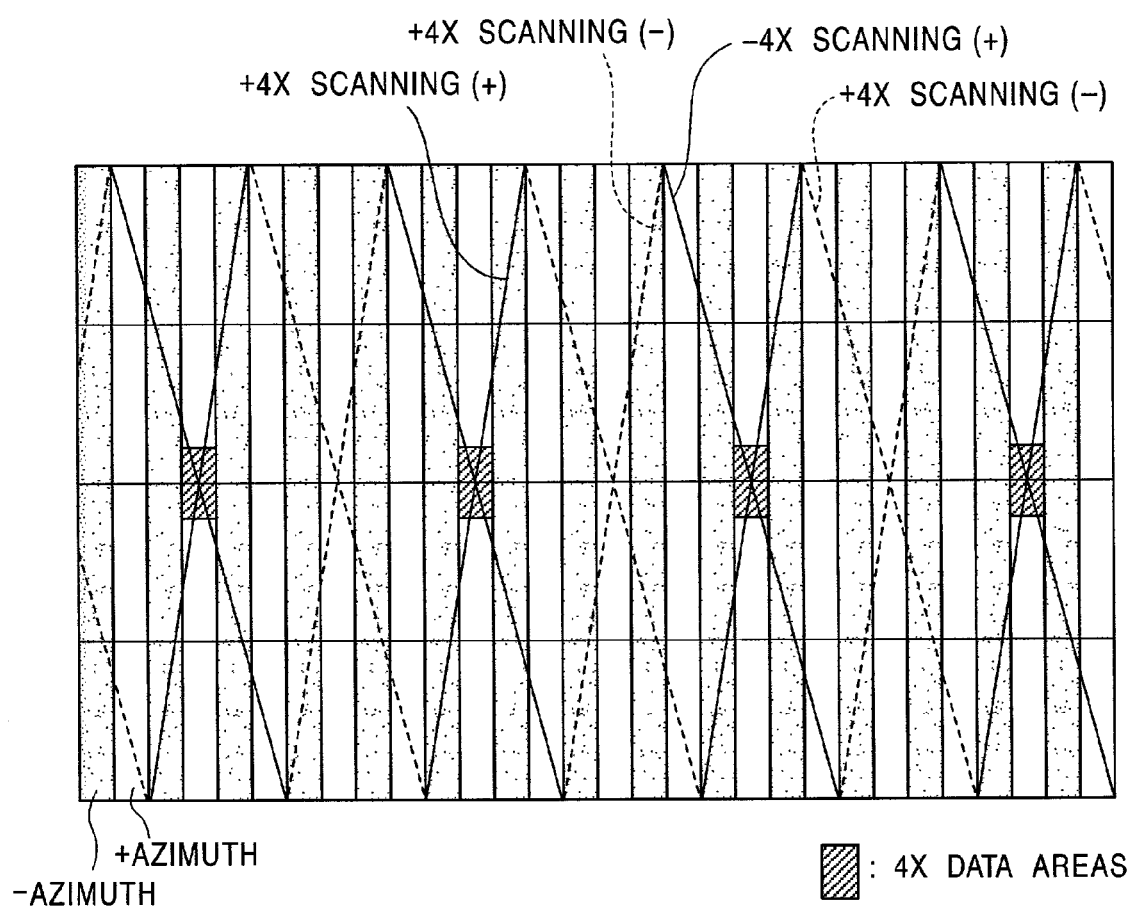
FIG. 6 is a view showing a data arrangement pattern of data for four-times-faster (4×) reading.

When the moving speed of the tape, serving as a recording medium, and the phase of head scanning against a tape pattern are maintained at constant values, data disposed at predetermined positions on the tape can always be traced. Therefore, image data for 4× reading is recorded at positions shown in FIG. 6. In FIG. 6, +4× scanning indicates 4× reading in the positive direction, and −4× scanning means 4× reading in the reverse direction.

Data for 4× reading is recorded by either the +head or the −head, and is used by 4× reading both in the positive and reverse directions. As shown in FIG. 6, data for 4× reading is disposed at the centers (positions corresponding to half the length) of tracks. When the reading speed increases, however, since the clusters surrounded by the envelope of the RF signal described by referring to FIG. 5 become smaller, the amount of data included in the clusters is reduced.

Figure 7:
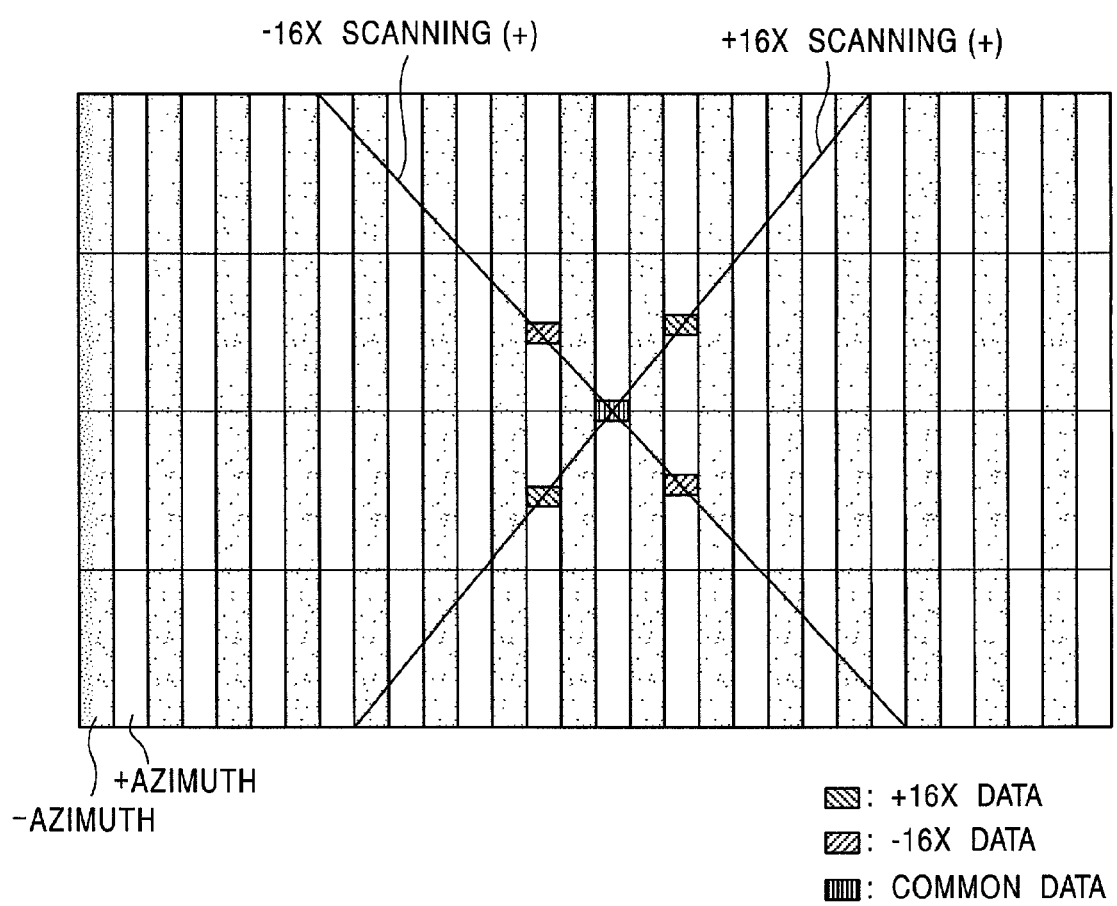
FIG. 7 is a view showing a data arrangement pattern of data for 16× reading.
Figure 8:
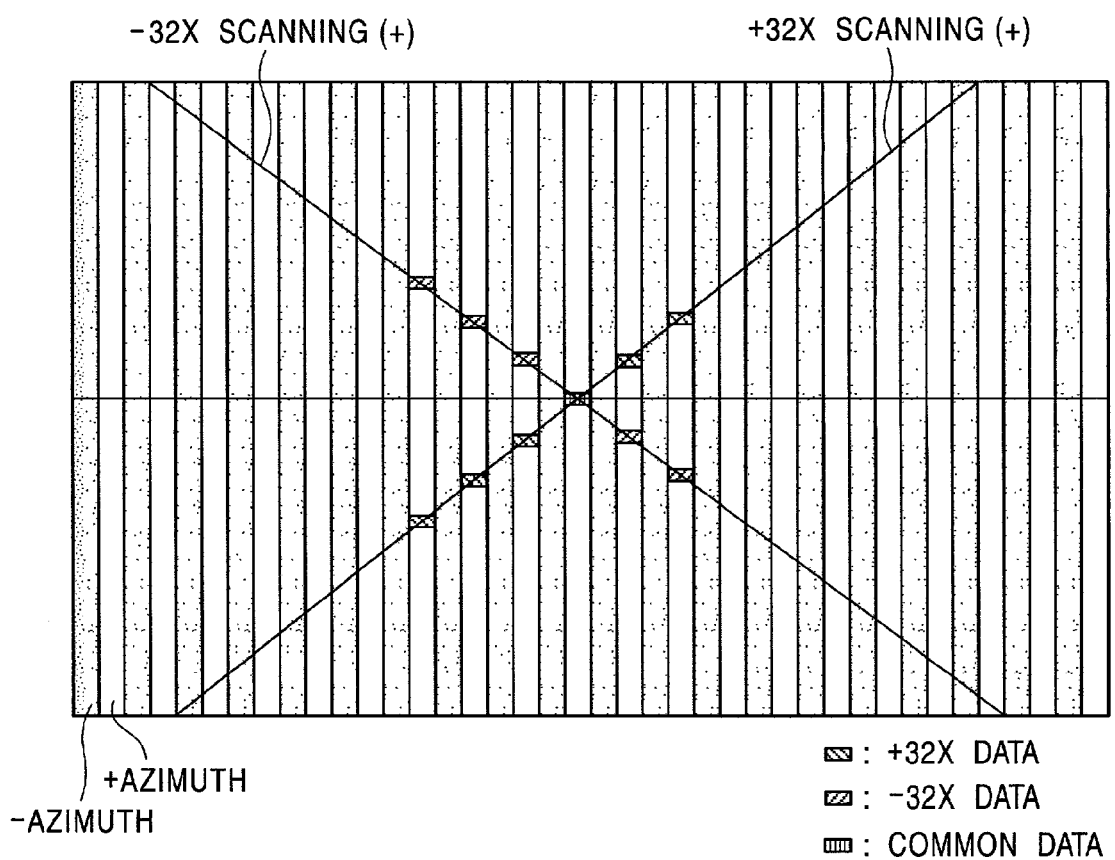
FIG. 8 is a view showing a data arrangement pattern of data for 32× reading.

Therefore, when the reading speed is increased, a sufficient amount of data cannot be recorded at the areas disposed at the centers. Consequently, data is distributed and recorded into a plurality of areas. FIG. 7 shows a data arrangement in 16× reading, and FIG. 8 shows a data arrangement in 32× reading.

As shown in FIG. 7, data for 16× reading is distributed to three locations (for example, in +16× scanning, three locations at the bottom left, the center, and the top right). Among them, data disposed at the center is used in common for 16× reading both in the positive (+) and reverse (−) directions. In the same way, data for 32× reading is distributed to six locations, as shown in FIG. 8. Among them, data disposed at the center is used in common for 32× reading both in the positive and reverse directions.

When data for variable-speed reading is arranged in this way at locations where the rotating head 8 always traces, data for displaying acceptable images even in variable-speed reading can be recorded while the amount of data recorded is kept as small as possible. Since the contact (touching) between the rotating head 8 and the tape, serving as a recording medium, is set most appropriate for normal reading, a sufficient contact is not obtained especially at the input end or the output end of a track during variable-speed reading. Therefore, the level of a read RF output is reduced and image data is not always obtained. Such an inconvenience is avoided with the above method.

There can be, however, a case in which a trace error occurs against a target trace position due to factors such as bending of a recording track caused by the recording and reproduction apparatus 1, trace distortion during reading, a recording-track positional shift caused by jitter in a speed servo during recording, and a moving-speed deviation caused by jitter in a phase-lock servo during reading. Therefore, data for variable-speed reading recorded in the above-described data arrangement cannot be obtained in some cases.

Figure 9:
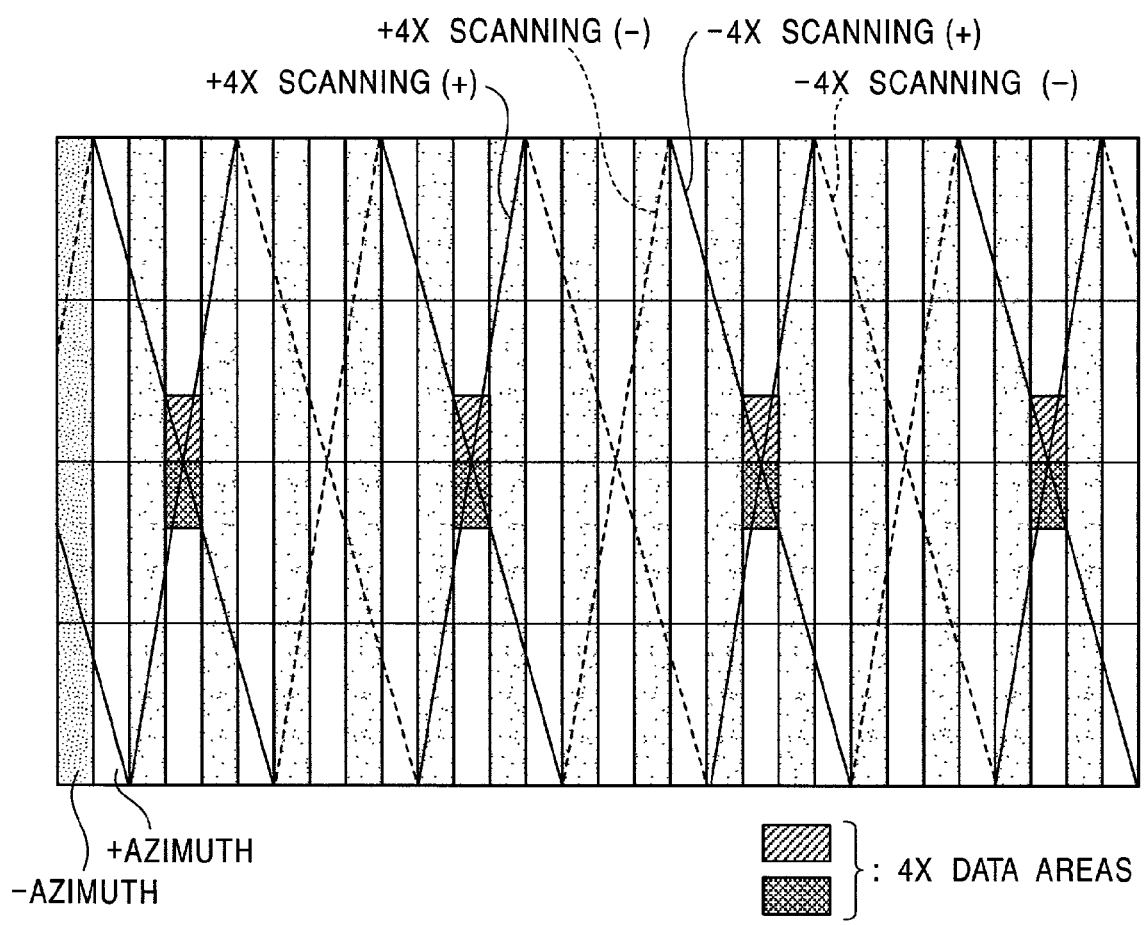
FIG. 9 is a view showing another data arrangement pattern of data for 4× reading.

To avoid such a case, data for variable-speed reading, which is traced by one scanning in each track is recorded repeatedly a plurality of times in vicinities of a target location (location to be traced when a trace-error caused by the above-described factors does not occur). FIG. 9 is a view showing a data arrangement for a case in which data for 4× reading is recorded twice.

In general, when recording is performed by the scanning of a rotating head in units of tracks on a recording medium such as a magnetic tape, each track is divided into sync blocks and data is recorded in units of sync blocks. The data arrangement shown in FIG. 9 will be further described below by referring to "in units of sync blocks."

Figure 10:
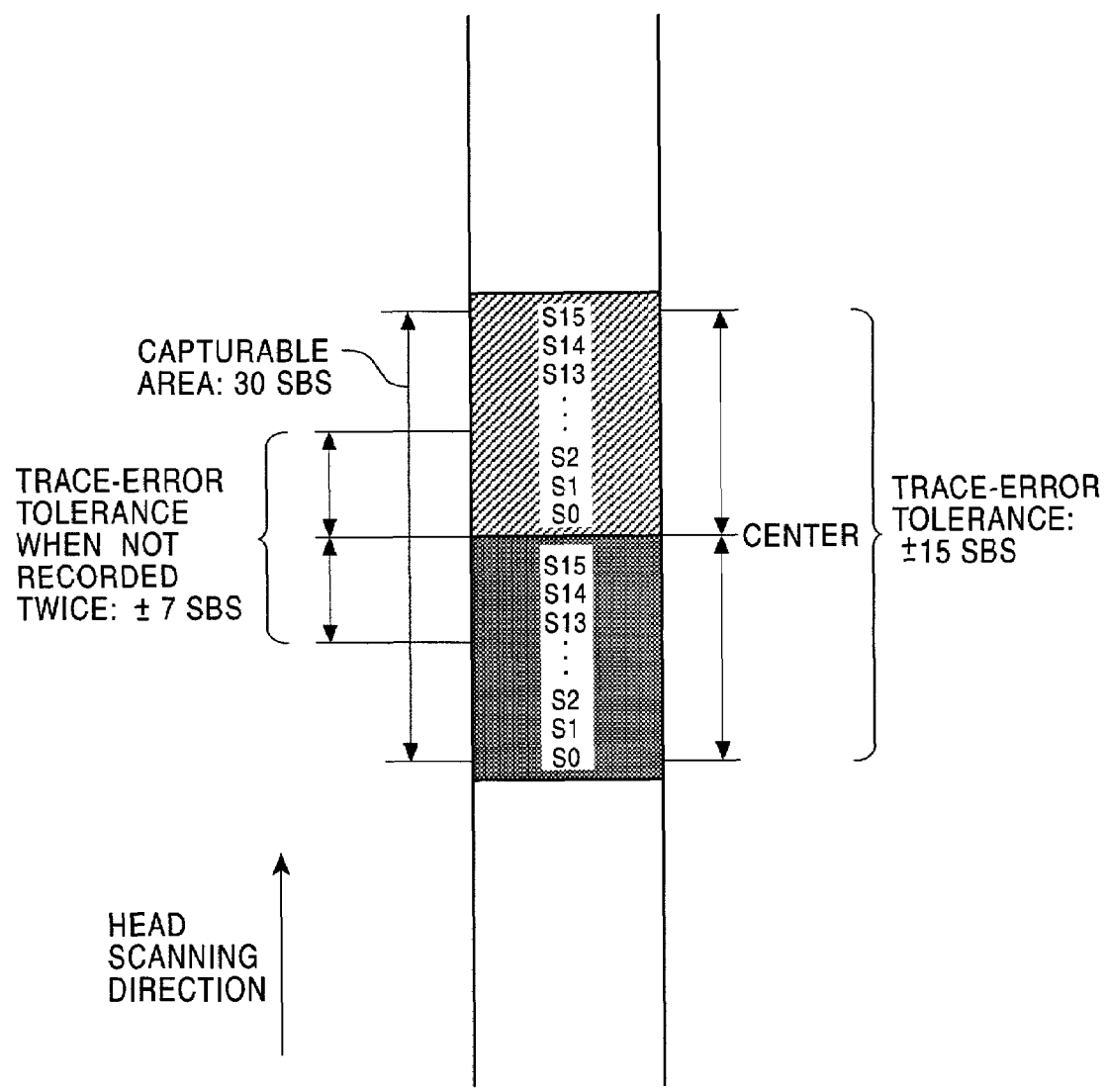
FIG. 10 is a view showing details of the data arrangement pattern shown in FIG. 9.

FIG. 10 is a view showing a data arrangement obtained in a case in which data for 4× reading is repeatedly recorded twice. In the figure, an SB is an abbreviation of a sync block. When the data is not recorded twice, in other words, when the data is recorded only once at the center areas of tracks, as shown in FIG. 6, a trace-error tolerance is ±7 SBs (sync blocks).

During 4× reading, the amount of data in 30 SBs can be captured in one track. The amount of data in 16 SBs from S0 to S15 has to be captured in one trace. Under these conditions, when the data is repeatedly recorded twice, the trace-error tolerance is increased to ±15 SBs.

Figure 11:
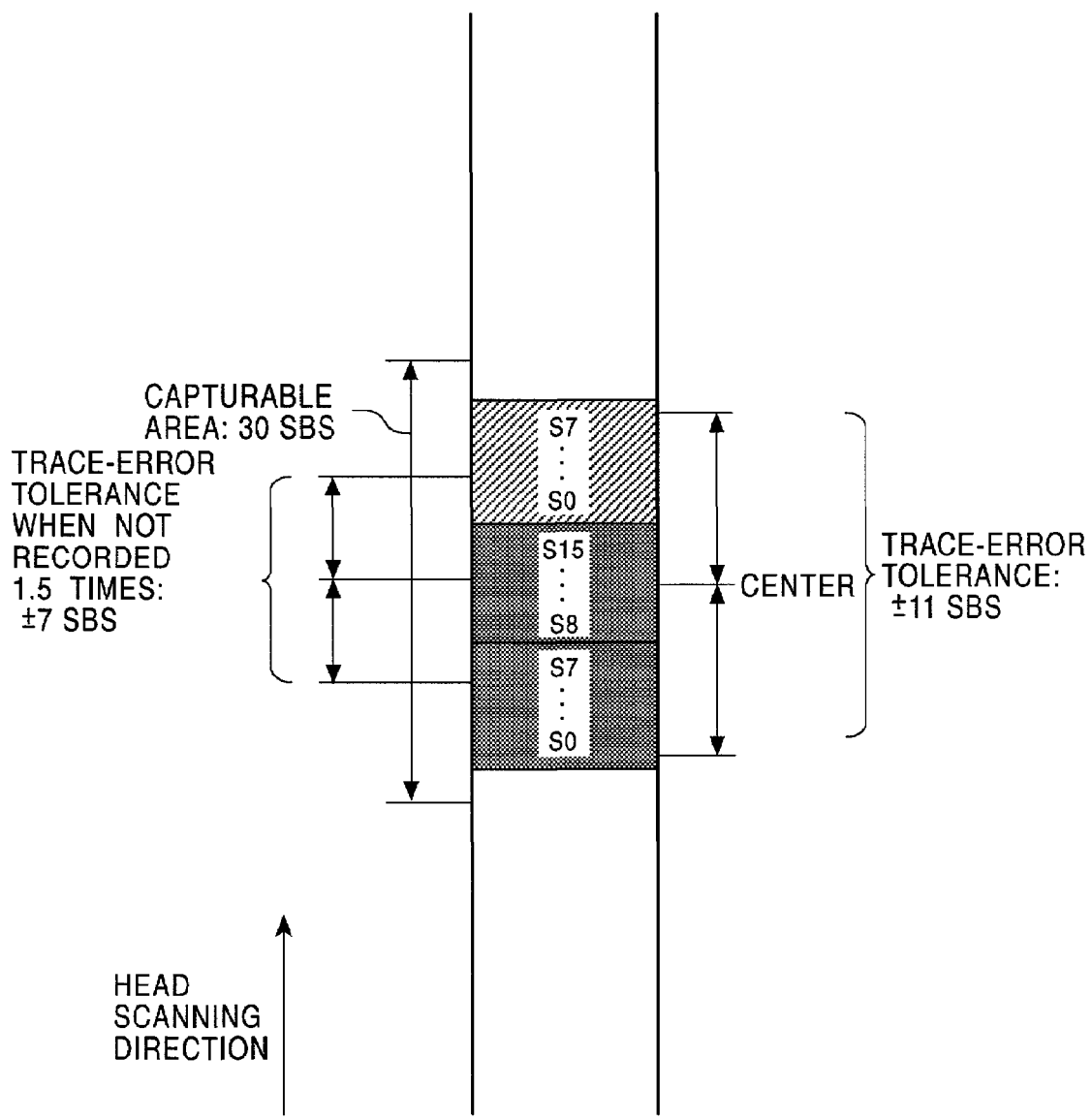
FIG. 11 is a view showing details of the data arrangement pattern shown in FIG. 9.

The number of times identical data is repeatedly recorded is not limited to two, and may be any value. In addition, the number of times may be not necessarily an integer. FIG. 11 shows a data arrangement obtained when the number of repetition times is set, for example, to 1.5. Recording identical data repeatedly 1.5 times means that half the data is repeatedly recorded twice. In other words, in the case shown in FIG. 11, data S0 to S7 is repeatedly recorded twice and data S8 to S15 is recorded only once.

When identical data is repeatedly recorded 1.5 times, the trace-error tolerance is ±11 SBs. Also in this case, the trace-error tolerance becomes larger compared with a case in which the data is recorded only once.

Figure 12:
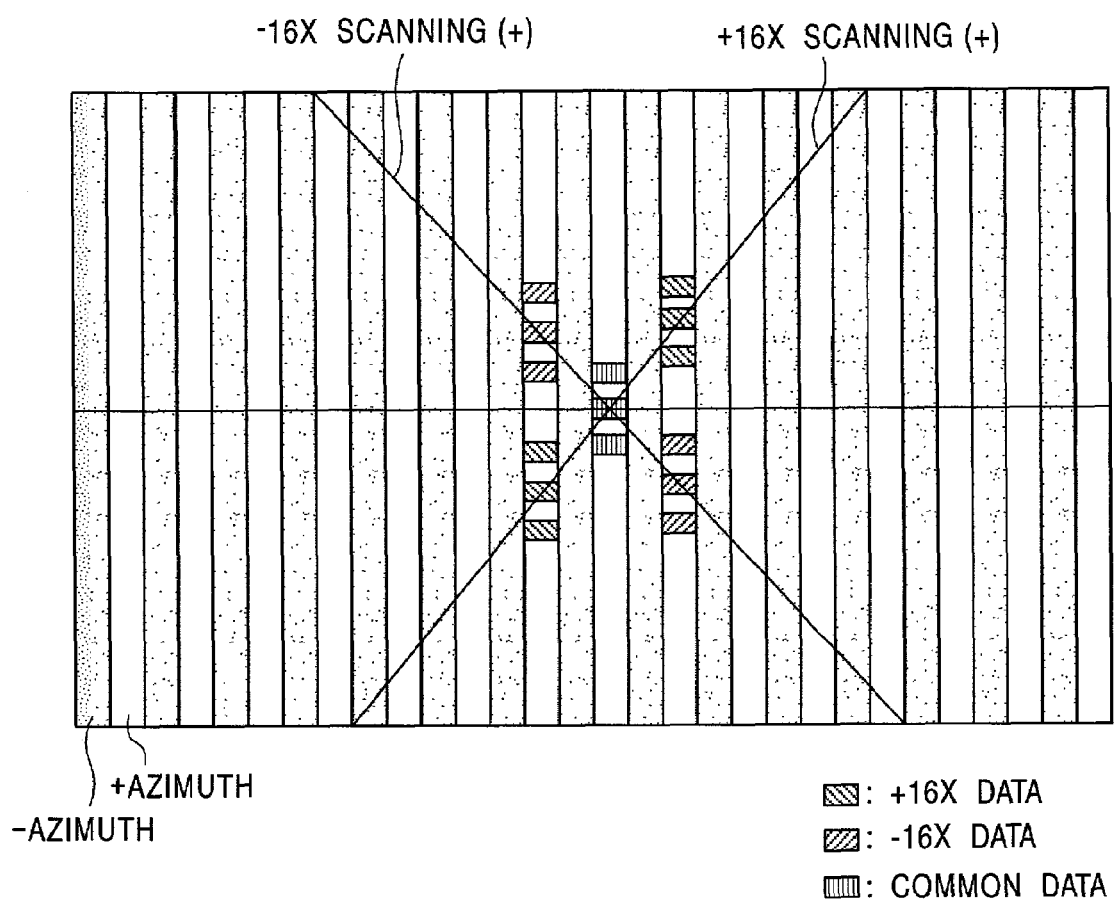
FIG. 12 is a view showing another data arrangement pattern of data for 16× reading.
Figure 13:
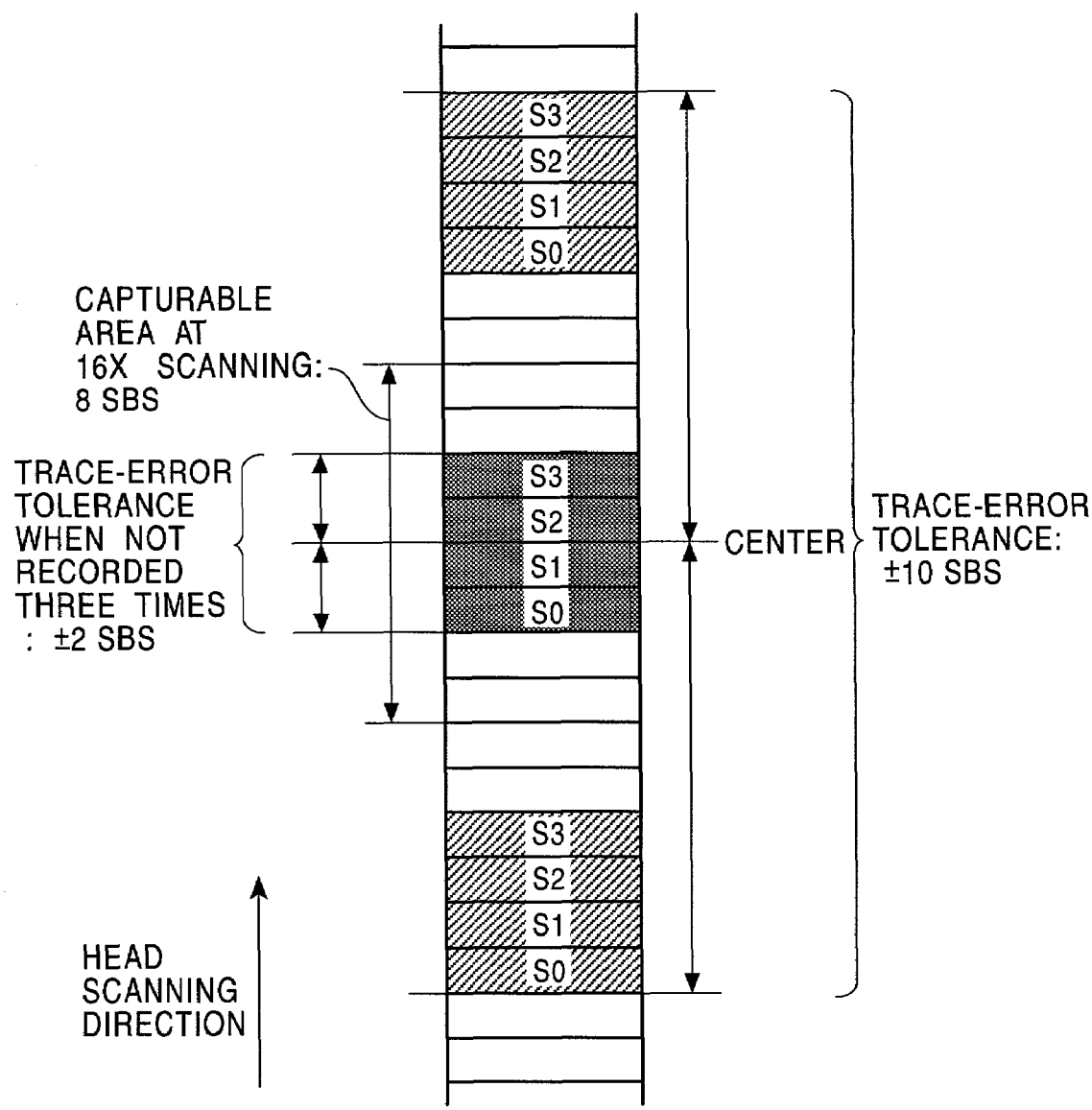
FIG. 13 is a view showing details of the data arrangement pattern shown in FIG. 12.

A data arrangement for 16× reading will be described next. FIG. 12 shows a data arrangement obtained in a case in which data for 16× reading is repeatedly recorded three times. This data arrangement is shown in units of sync blocks in FIG. 13. When data is not recorded three times, in other words, when data (common data) is recorded only once at the center area of a track, as shown in FIG. 7, the trace-error tolerance is ±2 SBs.

During 16× reading, the amount of data in 8 SBs can be captured in one track. The amount of data in 4 SBs from S0 to S3 has to be captured in one trace. Under these conditions, when data is repeatedly recorded three times, the trace-error tolerance is increased to ±10 SBs.

Figure 14:
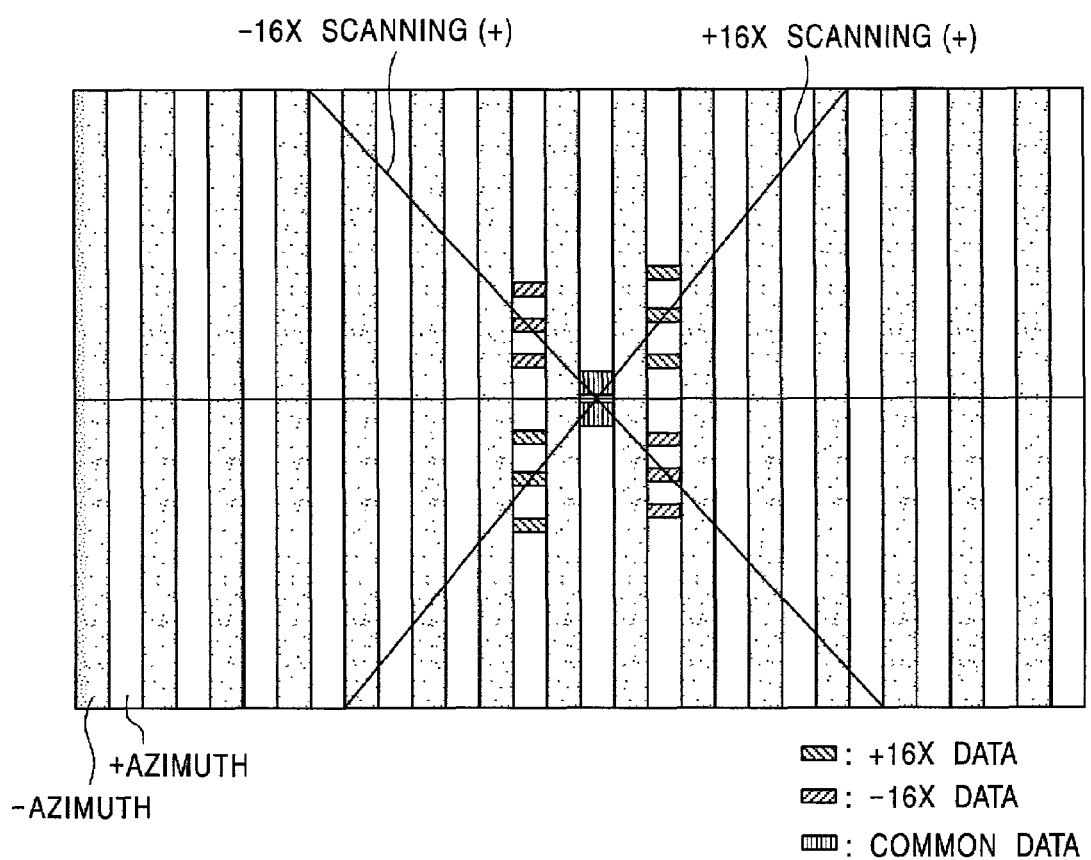
FIG. 14 is a view showing still another data arrangement pattern of data for 16× reading.

FIG. 14 shows another data arrangement for 16× reading. Data for 16× reading is repeatedly recorded twice or three times in the example data arrangement shown in FIG. 14. As shown in FIG. 14, a space is placed between data repeatedly recorded. When identical data is disposed with a space placed therebetween, to make the trace-error tolerance maximum, the space corresponding to M sync blocks needs to be placed, M being calculated from the following expression (1) where N indicates the amount of data disposed at one location, counted by the number of sync blocks, and L indicates the number of sync blocks from which data can be captured in the vicinity of the location.

$$M = L - N \quad (M \text{ is an integer equal to zero or more}) \qquad (1)$$

The larger the number M of sync blocks placed between data is against the number L of sync blocks from which data can be captured in the vicinity, the larger the trace-error tolerance is. In addition, the larger the number of times data is recorded is, the larger the tolerance is. When data is traced by using a technology such as phase-lock servo, the farther the head is from a target area, the larger a trace error is. FIG. 14 shows the data arrangement for 16× reading, obtained with these items being taken into account.

Figure 15:
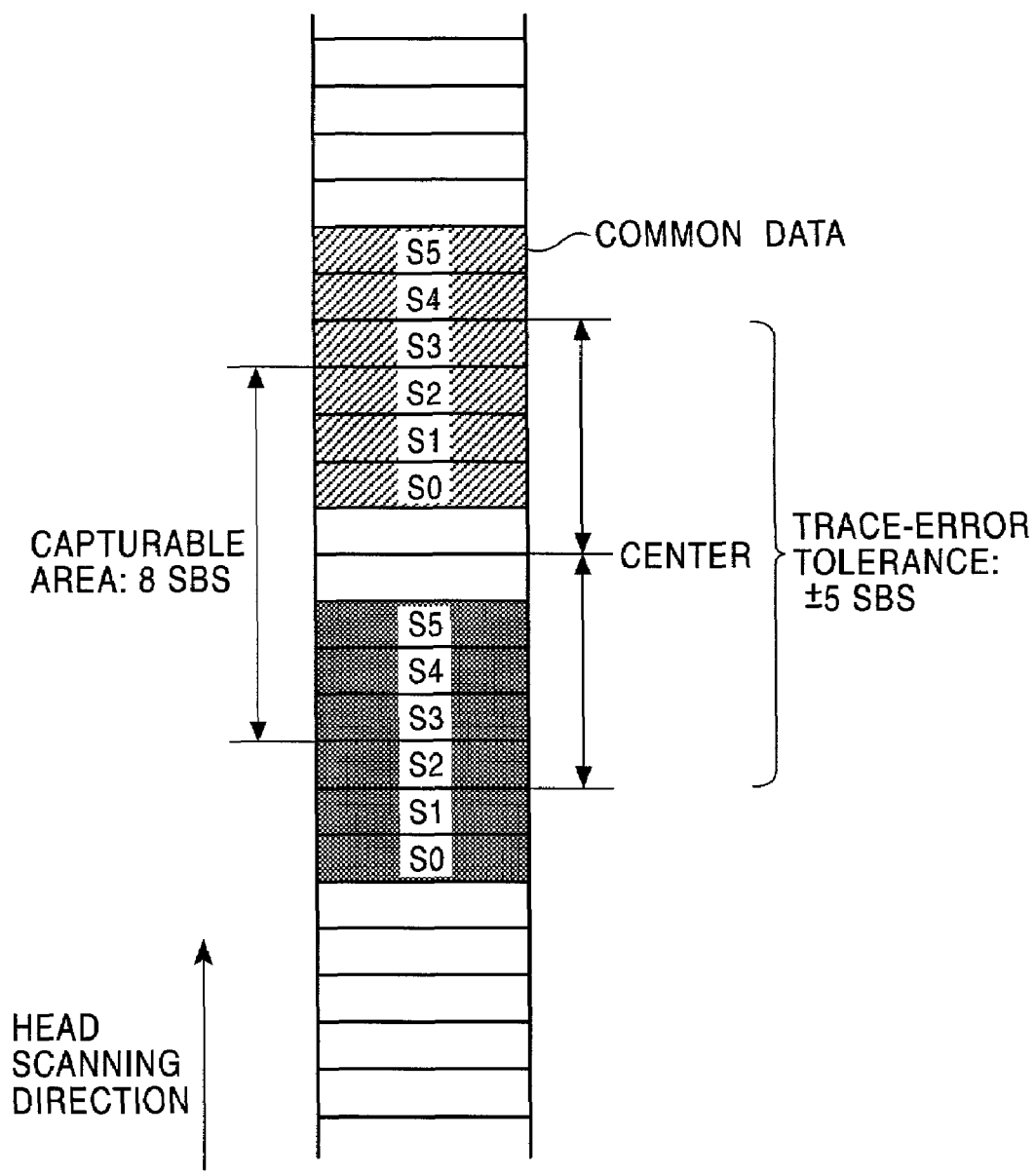
FIG. 15 is a view showing details of the data arrangement pattern shown in FIG. 14.
Figure 16:
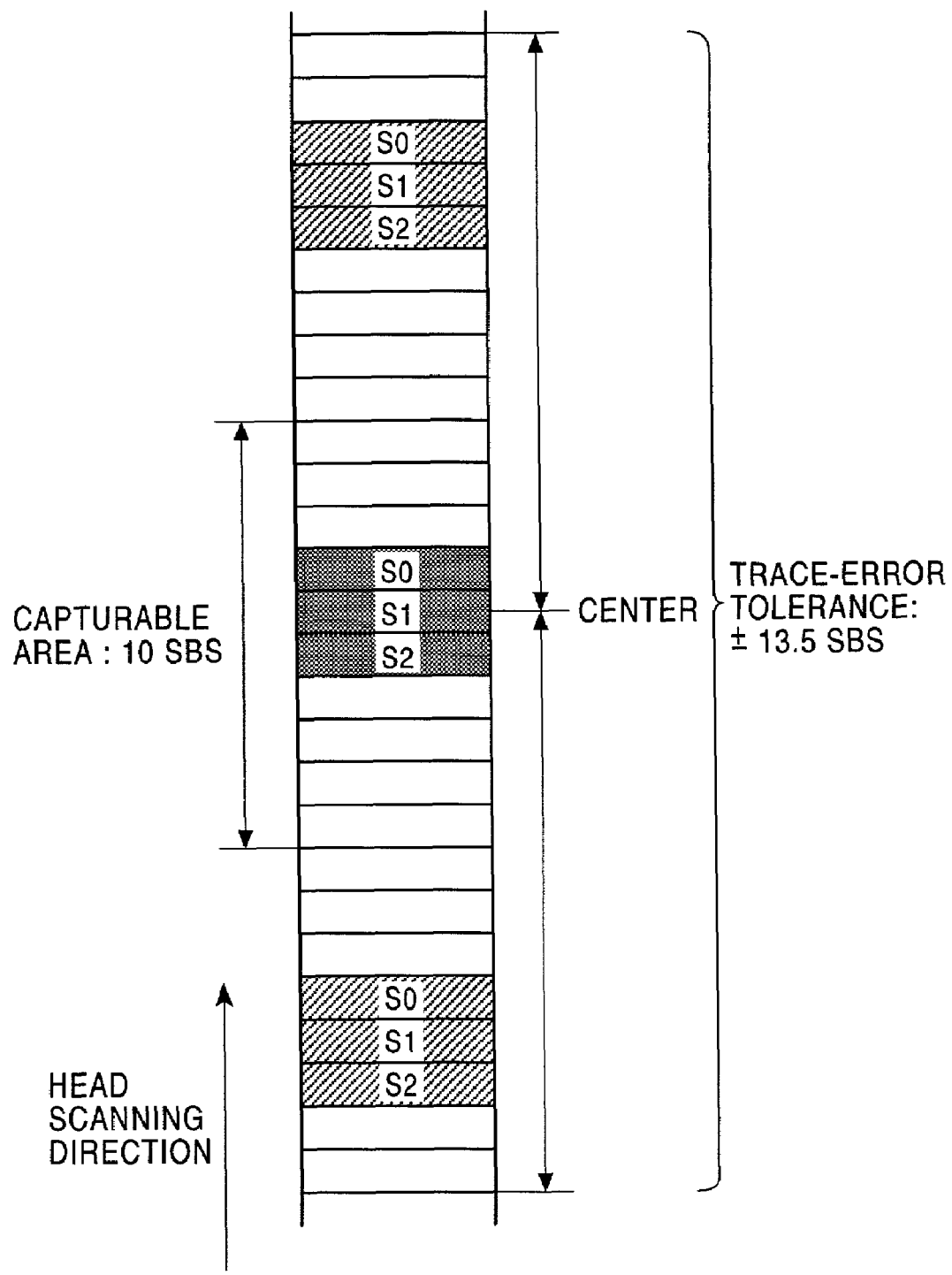
FIG. 16 is a view showing details of the data arrangement pattern shown in FIG. 14.
Figure 17:
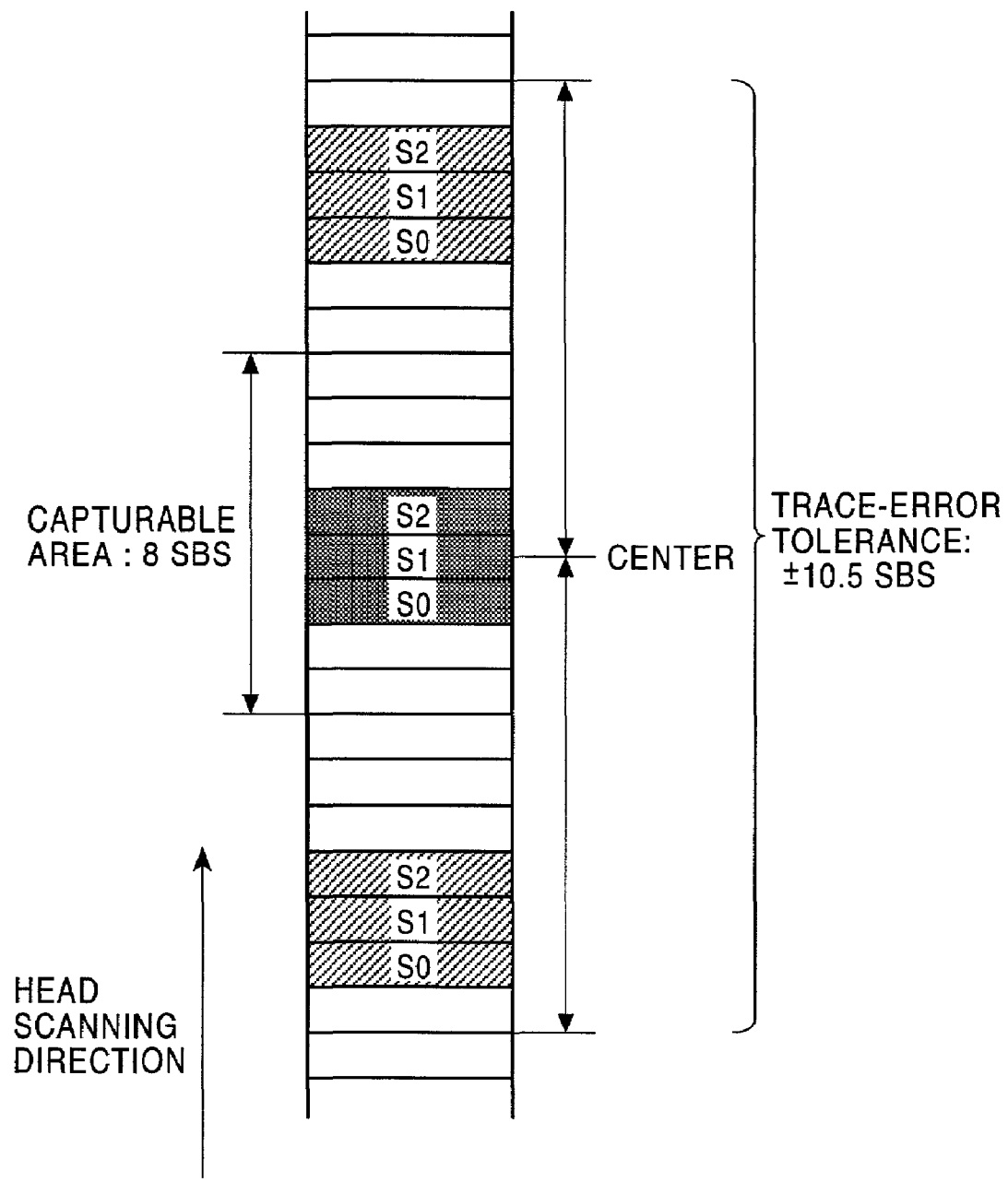
FIG. 17 is a view showing details of the data arrangement pattern shown in FIG. 14.

The data arrangement for 16× reading shown in FIG. 14 will be further described by referring to FIG. 15 to FIG. 17. FIG. 15 is a view showing an area (where common data is recorded) where identical data is repeatedly recorded twice, which is located at the center in the data arrangement shown in FIG. 14. The common data is repeatedly recorded twice, and a space as narrow as two sync blocks is placed between the common data. Since the required amount of data is obtained in one scanning and the number of times data is recorded is suppressed to two, the amount of data for variable-speed reading is reduced and the amount of main data (for normal reading) is increased. This is because, since the center area is a target position for phase-lock servo, only a minimum error such as servo jitter needs to be taken into account.

FIG. 16 is a view showing a data arrangement for +16× reading. Data for +16× reading is disposed at the lower left and the upper right against the common data in FIG. 14. The data for +16× reading is repeatedly recorded three times. Each data is formed of three SBs from S0 to S2, and a space of 7 SBs is placed between the data. With this arrangement, the trace-error tolerance becomes ±13.5 SBs.

In the same way, FIG. 17 is a view showing a data arrangement for −16× reading. Data for −16× reading is disposed at the upper left and the lower right against the common data in FIG. 14. The data for −16× reading is repeatedly recorded three times. Each data is formed of 3 SBs from S0 to S2, and a space of 5 SBs is placed between the data. Data S0 to S2 is recorded in the order reverse to that used for the data for +16× reading shown in FIG. 16. With this arrangement, the trace-error tolerance becomes ±10.5 SBs.

In the data arrangement shown in FIG. 16 or FIG. 17, the number of times data is recorded is set to three and a space as wide as 5 SBs or 7 SBs is placed between the data to increase the trace-error tolerance.

Figure 18:
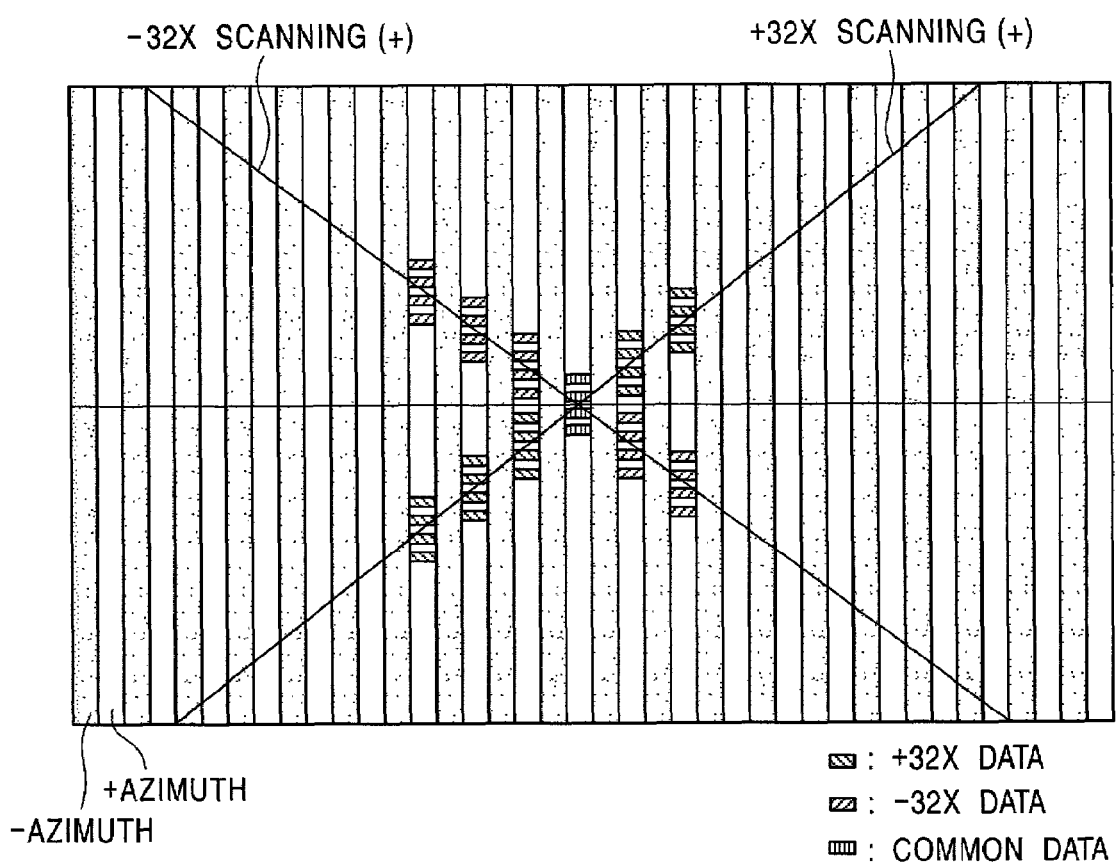
FIG. 18 is a view showing another data arrangement pattern of data for 32× reading.
Figure 19:
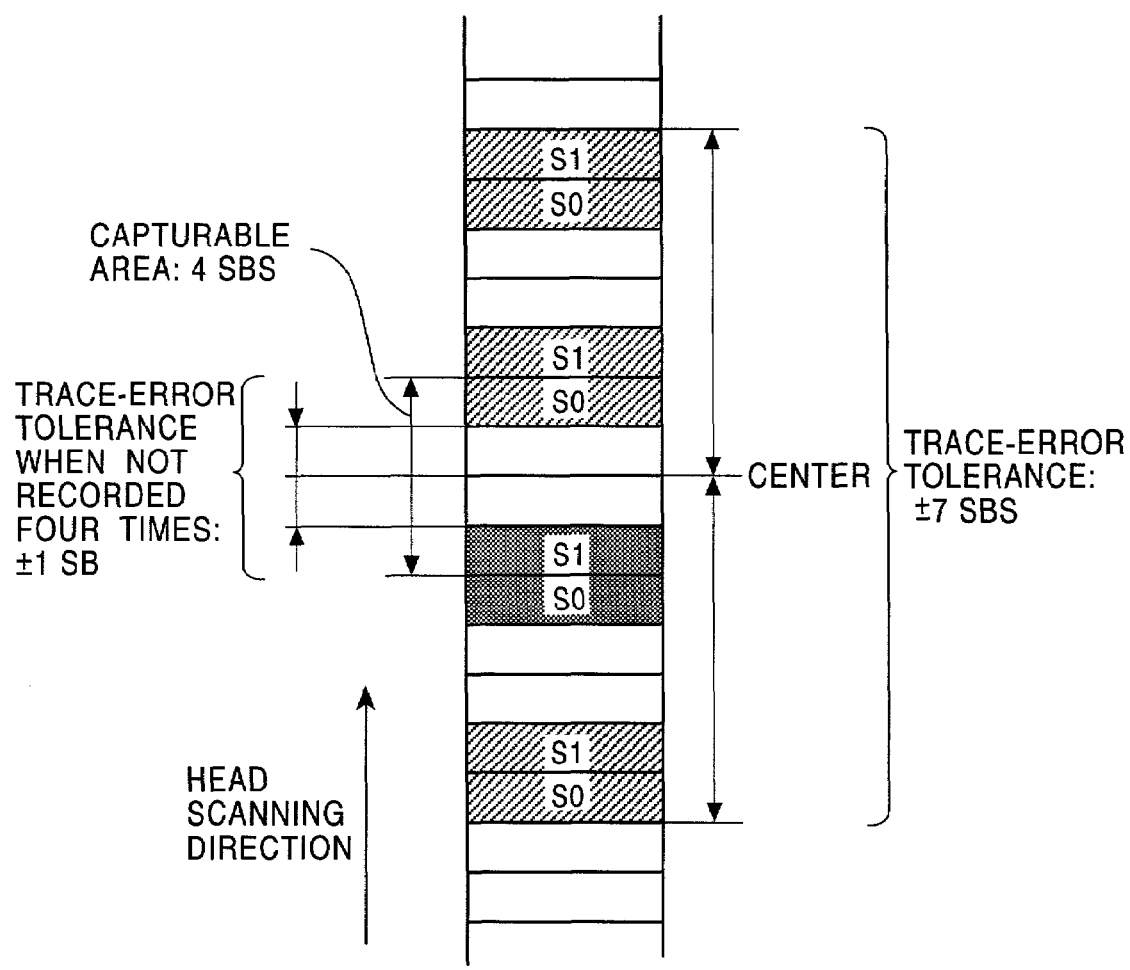
FIG. 19 is a view showing details of the data arrangement pattern shown in FIG. 18.

A data arrangement for 32× reading will be described next. FIG. 18 shows a data arrangement obtained in a case in which data for 32× reading is repeatedly recorded four times. This data arrangement is shown in units of sync blocks in FIG. 19. When data is not recorded four times, in other words, when data (common data) is recorded only once at the center area of a track, as shown in FIG. 8, the trace-error tolerance is ±1 SBs.

During 32× reading, the amount of data in 4 SBs can be captured in one track. The amount of data in two SBs from S0 to S1 has to be captured in one trace. Under these conditions, when the data is repeatedly recorded four times, the trace-error tolerance is increased to ±7 SBs. A space corresponding to the number M of sync blocks, calculated by the expression (1), is placed between data recorded repeatedly in this way.

Figure 20:
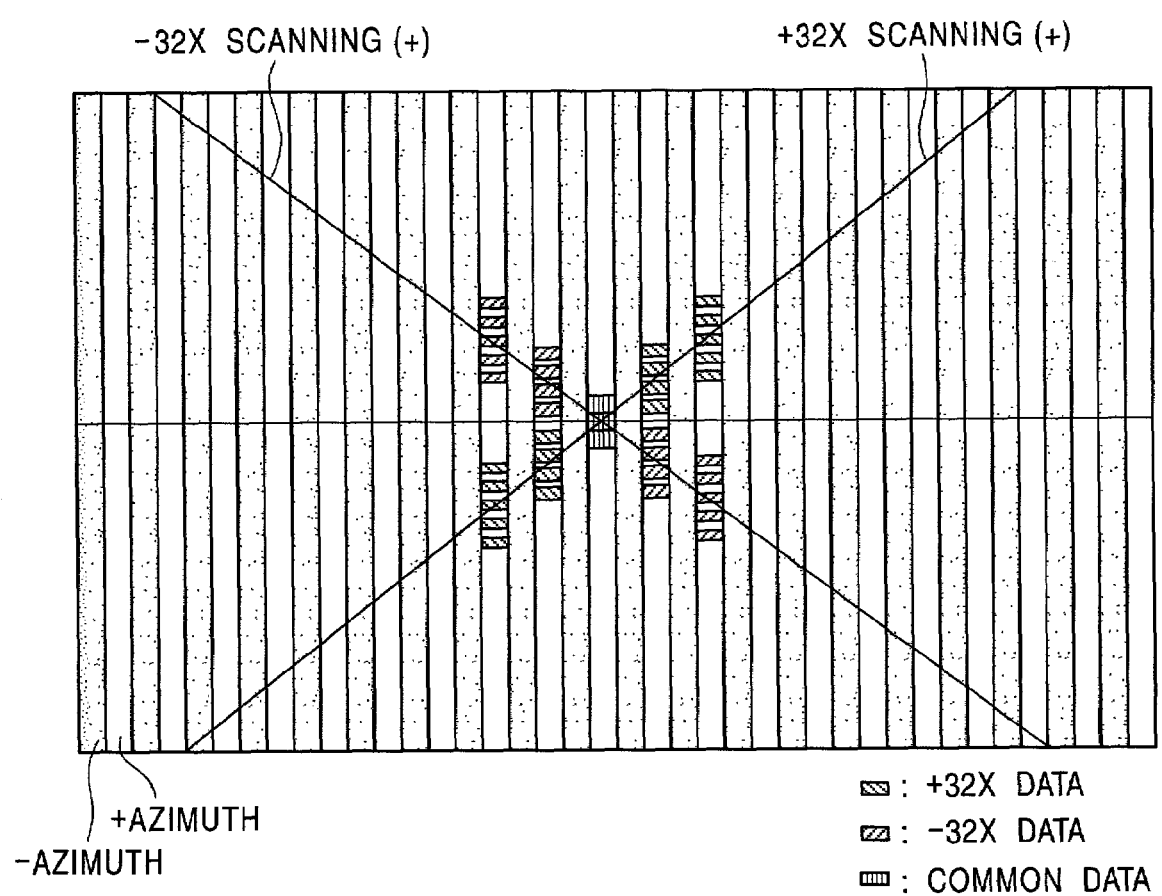
FIG. 20 is a view showing still another data arrangement pattern of data for 32× reading.

FIG. 20 shows another data arrangement for 32× reading. Data for 32× reading is repeatedly recorded three times, four times, or five times in the data arrangement shown in FIG. 20. Also in the data arrangement shown in FIG. 20, a space corresponding to the number M of sync blocks, calculated by the expression (1), is placed between the data.

Figure 21:
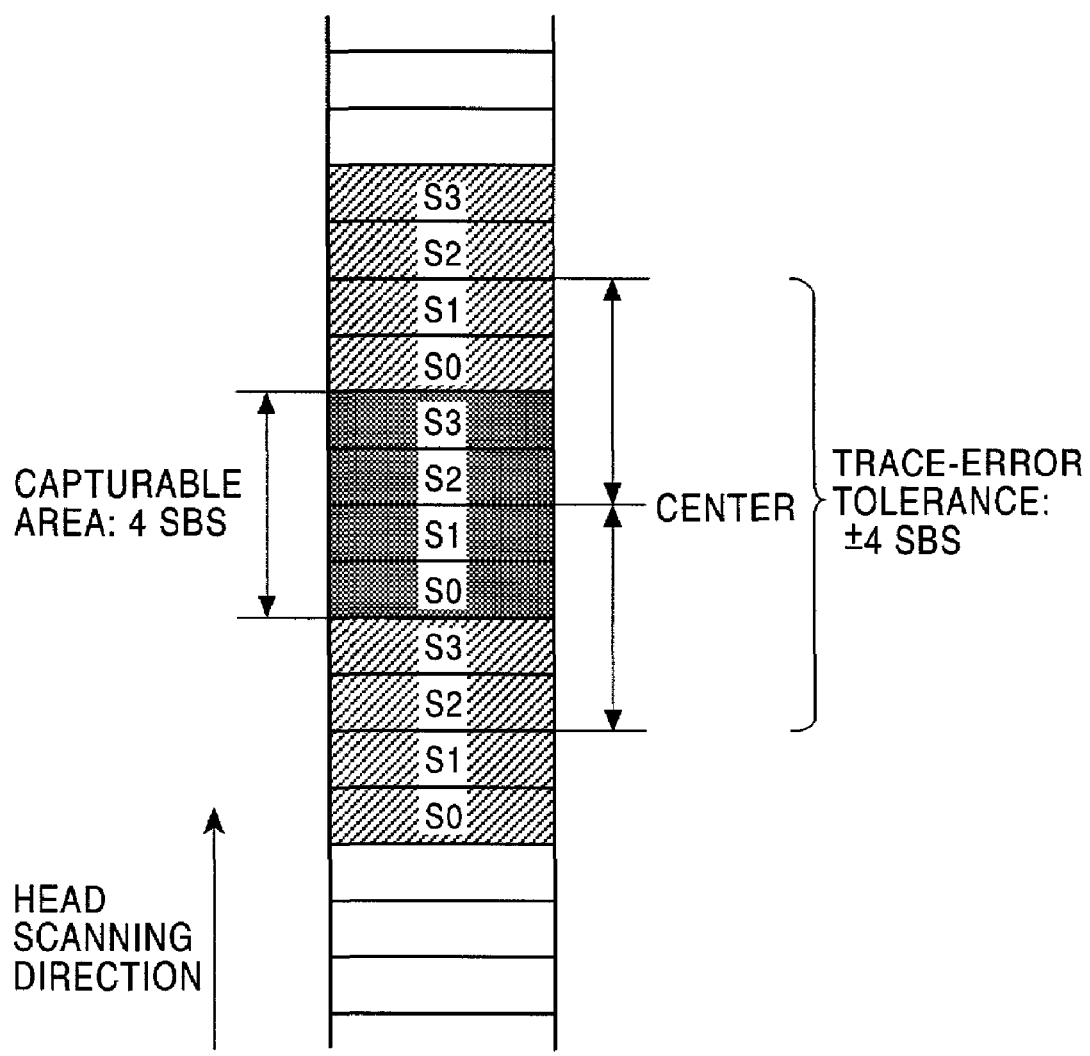
FIG. 21 is a view showing details of the data arrangement pattern shown in FIG. 20.
Figure 22:
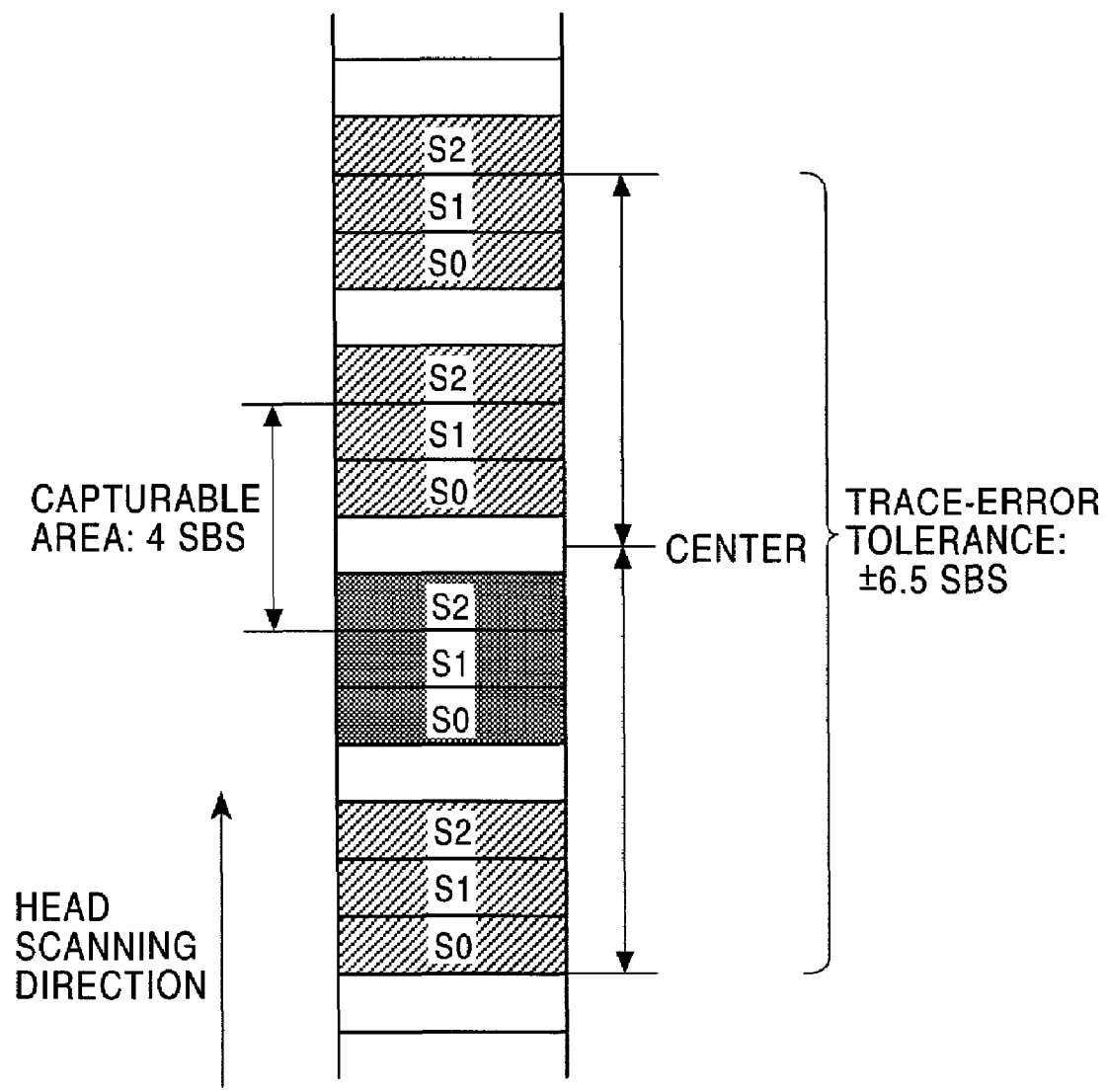
FIG. 22 is a view showing details of the data arrangement pattern shown in FIG. 20.
Figure 23:
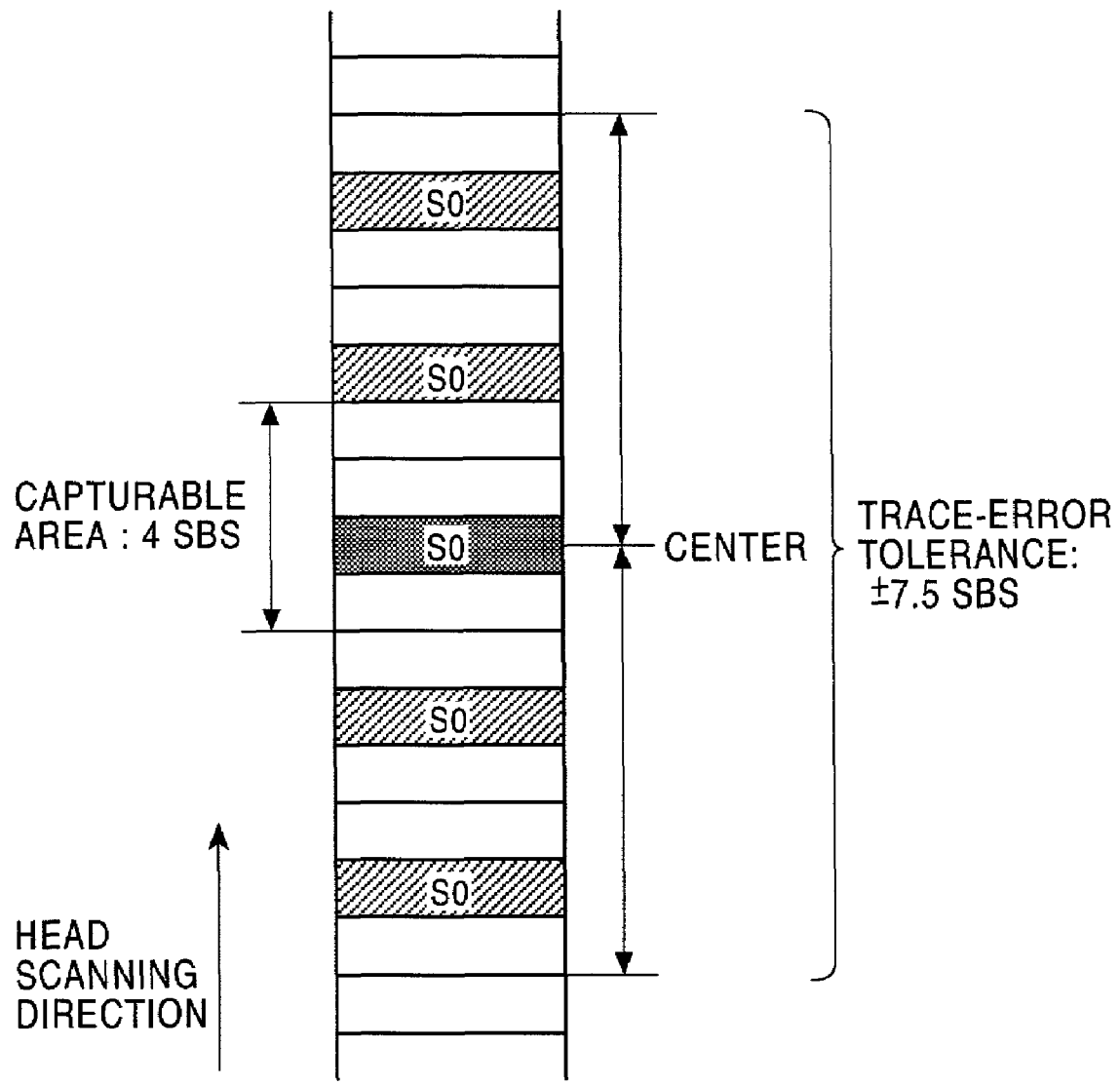
FIG. 23 is a view showing details of the data arrangement pattern shown in FIG. 20.

The data arrangement for 32× reading shown in FIG. 20 will be further described by referring to FIG. 21 to FIG. 23. FIG. 21 is a view showing an area (where common data is recorded) where identical data is repeatedly recorded three times, which is located at the center in the data arrangement shown in FIG. 14. The common data is repeatedly recorded three times, and a space is not placed between the common data. When the common data is recorded in this way, a capturable area is four SBs, and the trace-error tolerance is ±4 SBs.

FIG. 22 is a view showing a data arrangement for 32× reading, and illustrates data recorded by an identical head and recorded at a position most adjacent to that of the common data in the data arrangement shown in FIG. 20. The data for 32× reading recorded at such a position is repeatedly recorded four times. Each data is formed of three SBs from S0 to S2, and a space of only one SB is placed between the data. With this arrangement, the trace-error tolerance becomes ±6.5 SBs.

In the same way, FIG. 23 is a view showing a data arrangement for 32× reading, and illustrates data recorded by an identical head and recorded at a position next most adjacent to that of the common data in FIG. 20. The data for 32× reading recorded at such a position is repeatedly recorded five times. Each data is formed of one SB in S0, and a space of only two SBs is placed between the data. With this arrangement, the trace-error tolerance becomes ±7.5 SBs.

Figure 24:
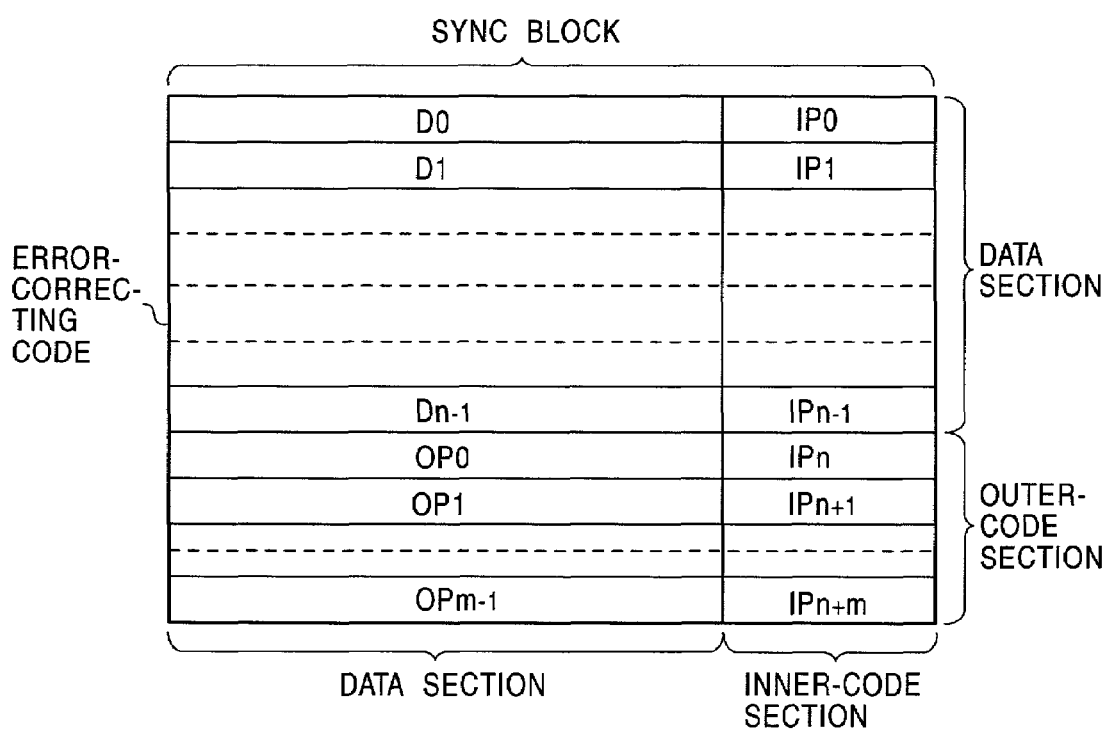
FIG. 24 is a view showing error-correcting codes.

Error correction will be described next. As understood from the structure of the recording and reproduction apparatus 1 shown in FIG. 1, the data multiplexing section 4 multiplexes data such as image data and audio data, and the error-correcting-code adding section 6 adds error-correcting codes. The structure of the error-correcting codes added is shown in FIG. 24. As shown in FIG. 24, one sync block is formed of a data section and an inner-code section (inner parity). An outer-code section (outer parity) is added to one data section formed of a plurality of sync blocks. With such a structure, a large immunity to an error which occurs in units of sync blocks is provided.

In general, when a tape-shaped recording medium is used, it is known that there may occur a burst error (error which occurs continuously) caused by a defect or scratch on a magnetic material applied to the medium in addition to a random error (error which occurs not periodically and independently). As a countermeasure, one error-correcting outer code is generated for sync blocks recorded into a plurality of tracks and these sync blocks are re-arranged according to a predetermined rule over all the tracks where the sync blocks are disposed. Such a re-arrangement processing is called interleaving.

Figure 25:
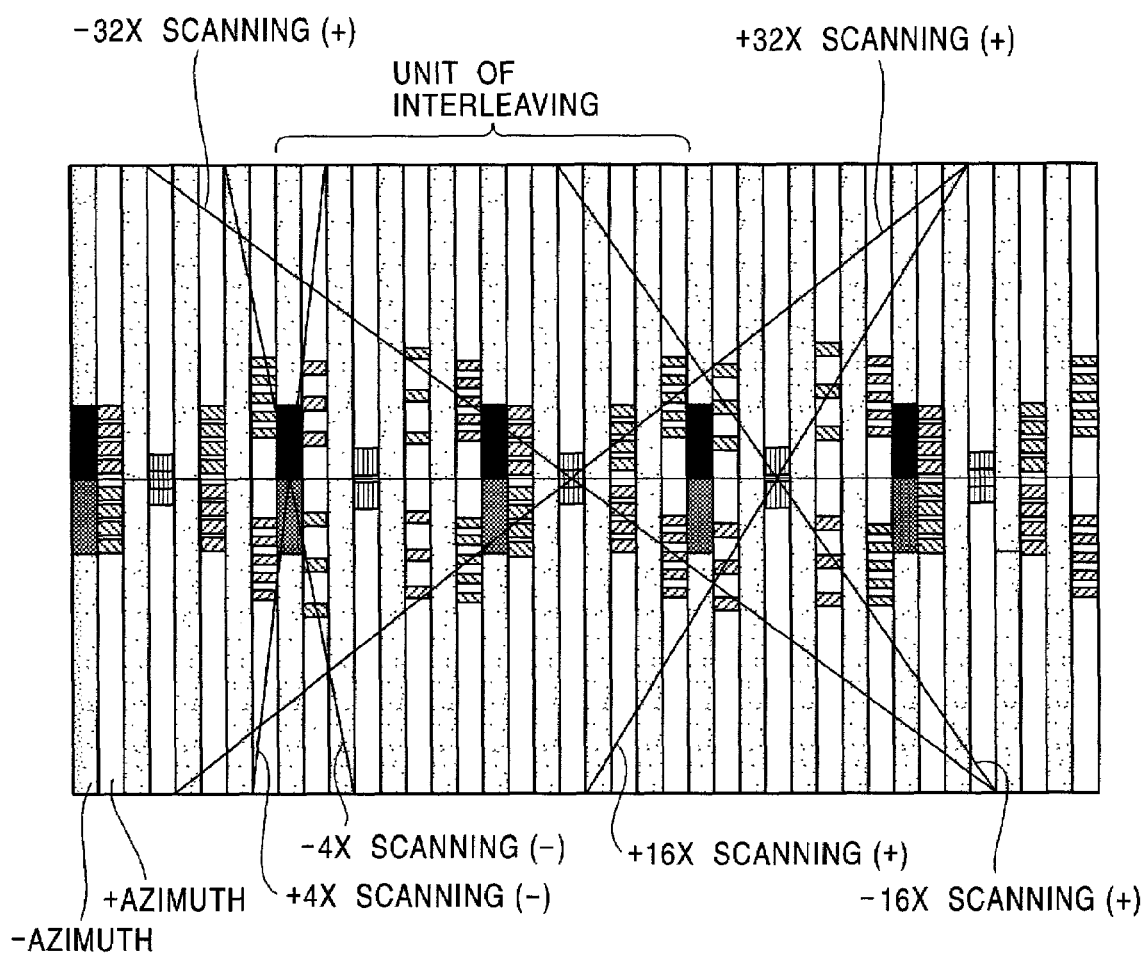
FIG. 25 is a view showing a data arrangement pattern generated with interleaving taken into account.

In low-bit-rate compression recording, since recording-signal processing performed in units of interleaving makes processing such as editing easier and the scale of the recording and reproduction apparatus 1 smaller, it is preferred that the recording pattern of data for variable-speed reading also correspond to interleaving. FIG. 25 shows a data arrangement for variable-speed reading with interleaving taken into account. More specifically, FIG. 25 includes, in one figure, the data arrangement for 4× reading shown in FIG. 9, the data arrangement for 16× reading shown in FIG. 14, and the data arrangement for 32× reading shown in FIG. 20, with interleaving taken into account.

Figure 26:
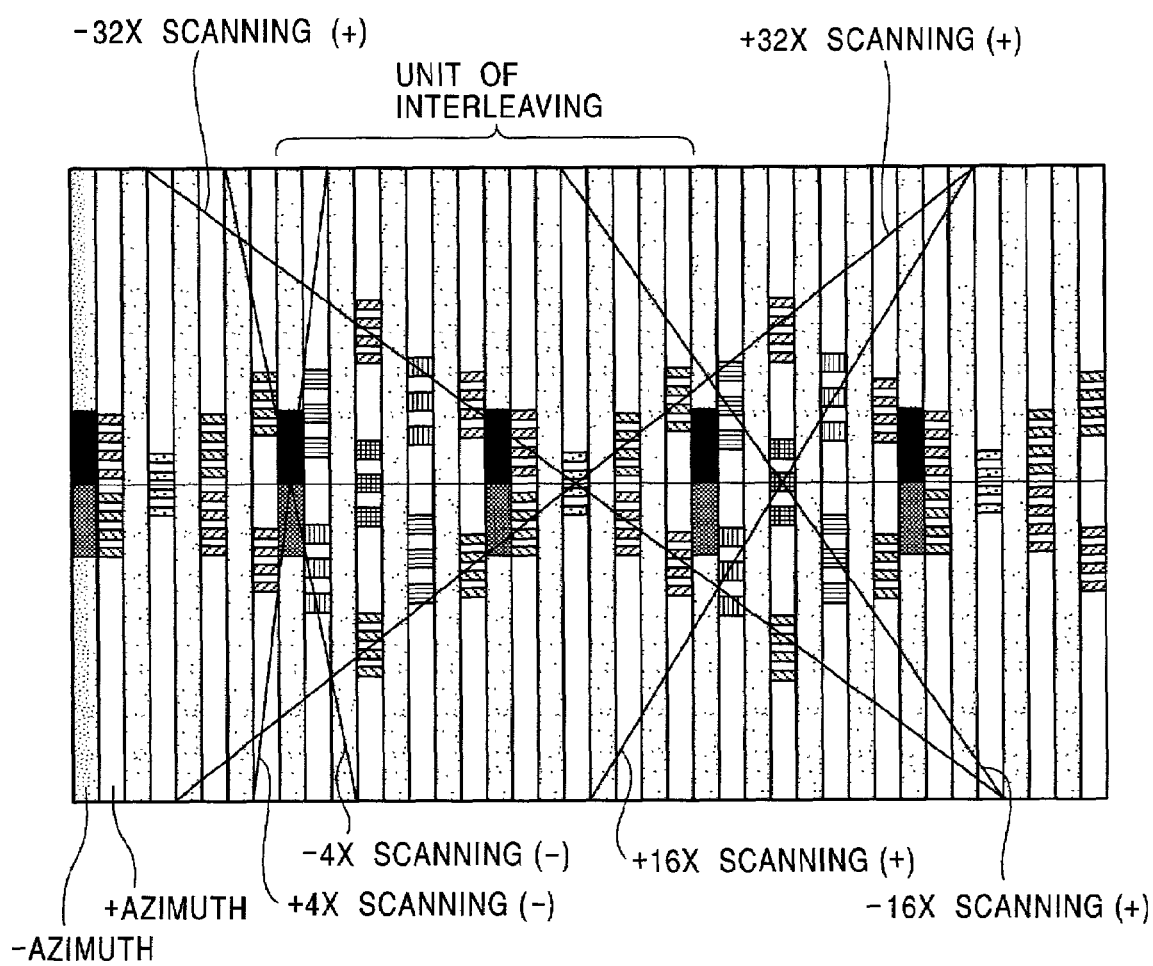
FIG. 26 is a view showing another data arrangement pattern generated with interleaving taken into account.

FIG. 26 includes, in one figure, the data arrangement for 4× reading shown in FIG. 9, the data arrangement for 16× reading shown in FIG. 12, and the data arrangement for 32× reading shown in FIG. 18, with interleaving taken into account.

In FIG. 25 or FIG. 26, 16 tracks are used as a unit of interleaving. A sufficient amounts of data are obtained when the pattern of data arrangement for 32× reading appears every 64 tracks and the pattern of data arrangement for 16× reading appears every 32 tracks. To reduce the types of patterns of data arrangement in the unit of interleaving, data for 32× reading is repeatedly recorded four times and data for 16× reading is repeatedly recorded twice.

Figure 27:
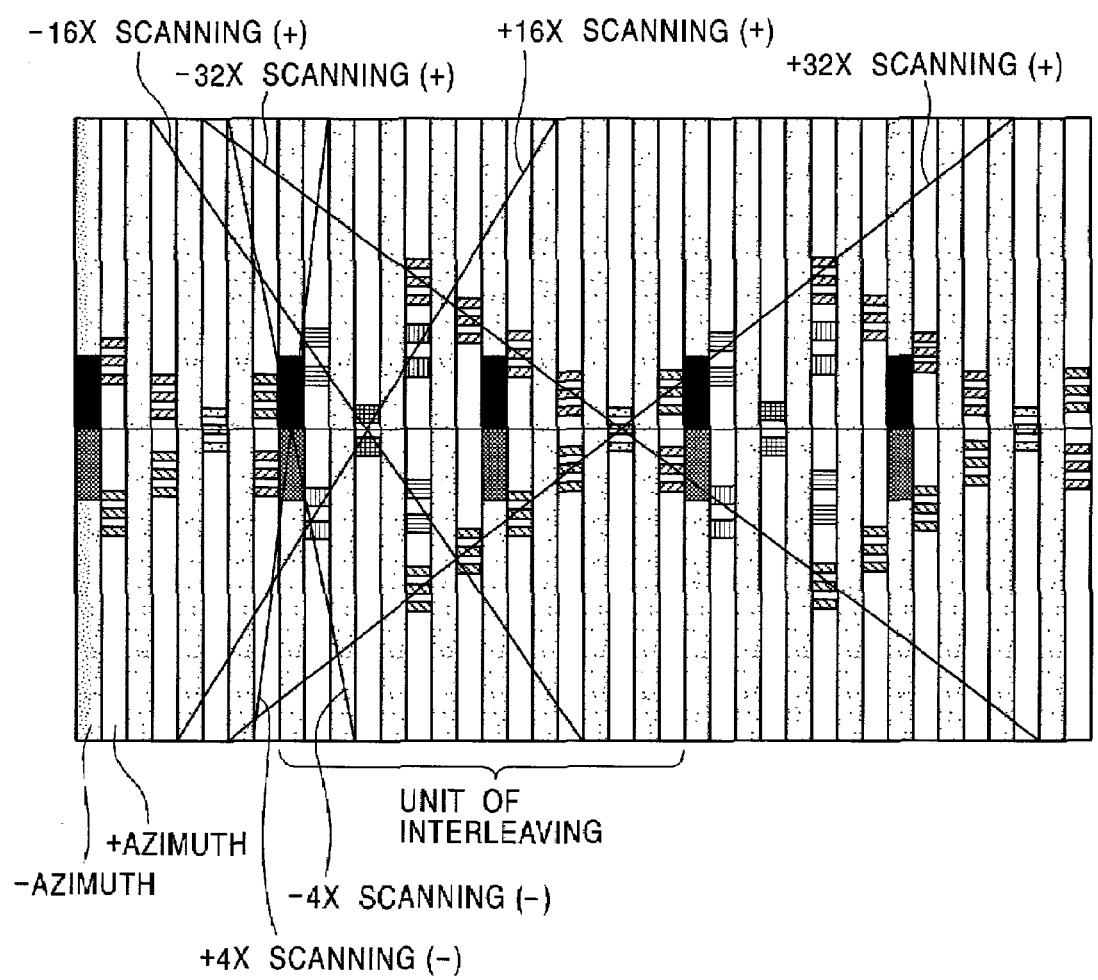
FIG. 27 is a view showing still another data arrangement pattern generated with interleaving taken into account.

Of the data arrangements shown in FIG. 25 and FIG. 26, either may be taken as an example. In the data arrangement shown in FIG. 26, for example, since a part of data for 32× reading interferes with data for 16× reading, data recorded at end areas is moved to next appropriate areas, unlike the data arrangement for 32× reading shown in FIG. 18, and the number of repetitive recording in an identical track is reduced, so that the data arrangement may be changed to that shown in FIG. 27.

In the foregoing description, data arrangements for 4× reading, 16× reading, and 32× reading are explained. The present invention can also be applied to other variable-speed reading. A sharing method with data for low-speed reading (reading at variable speeds equal to 4× or less) will be described next.

It is assumed that compression is performed according to the MPEG2 method and recording is achieved in units of GOPs specified by n=15 and m=3. When data is recorded according to the physical format of a commercial Digital Video (DV) format, the number of recording tracks per second is 300. Therefore, the average number of tracks per GOP is 150. When the data is traced at 4× reading, even with one azimuth, tracing is performed 18 times, and it is possible that data of one image for variable-speed reading is recorded into 150 tracks. In the data of one image for variable-speed reading, data for generating an I picture is generated first.

The data recorded with the foregoing items taken into account is read at a variable speed. Data for ±4× reading can be of course traced at ±4× reading. The data can be traced in principle at ±2× reading, which has a half speed of 4×, at −1× reading, which has a quarter speed of 4×, and ±8× reading, which has a double speed of 4×. When the data for 4× reading is read at other variable speeds, the update rate of an output image differs. More specifically, eight planes of images can be updated in a second at 4× reading, four planes per second at 2× reading, and two planes per second at 1× reading. Conversely, 16 planes of images can be theoretically updated in a second at 8× reading, but actually, information of only a half of the screen is obtained and therefore, it is necessary to update the entire screen by arranging data effectively.

Figure 29:
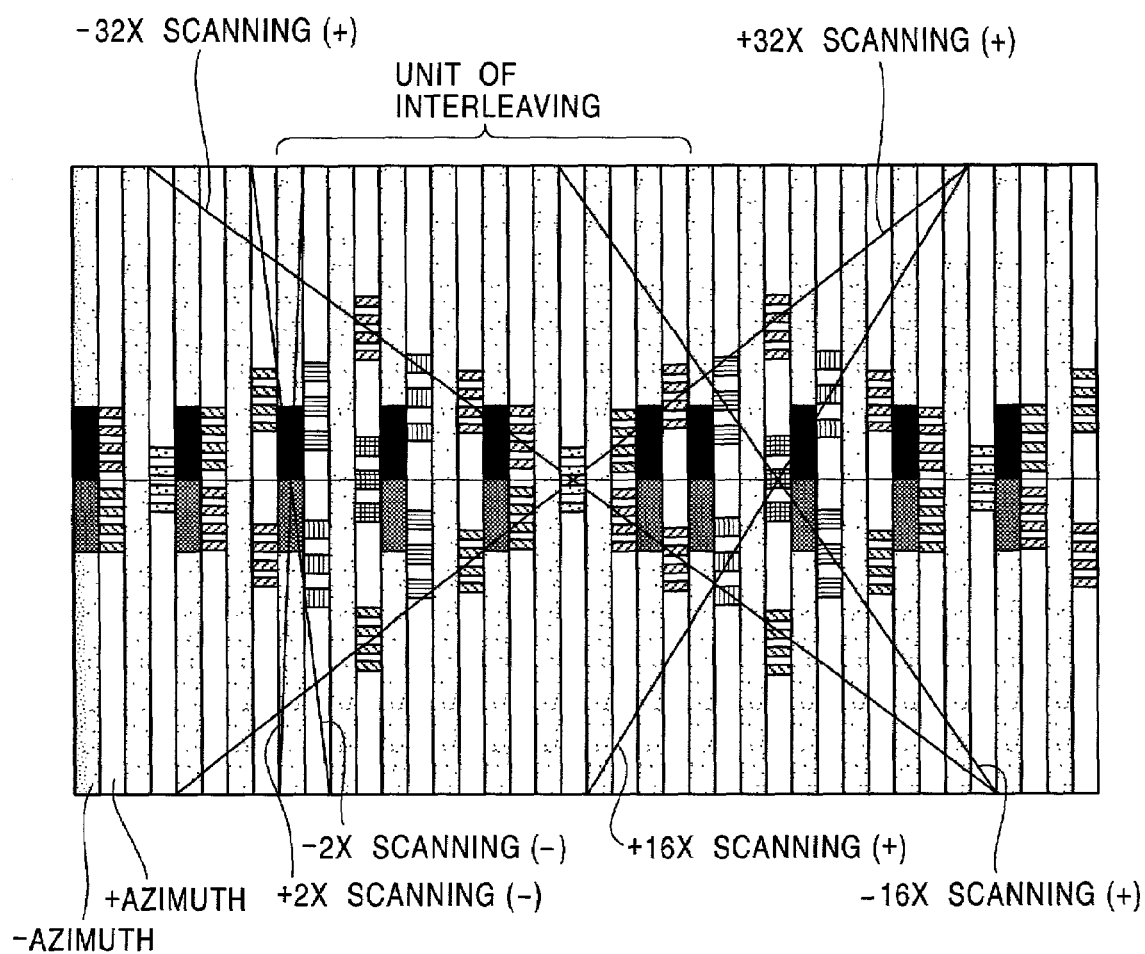
FIG. 29 is a view showing another data arrangement pattern generated with low-speed reading taken into account.

When a function for processing data for variable-speed reading, such as that achieved by the data generating section 5 for variable-speed reading and the memory 11 for variable-speed reading, is provided as in the recording and reproduction apparatus 1 shown in FIG. 1, and two planes of images are supplied per GOP, if data is disposed at an interval of four tracks, eight planes of images can be updated at 2× reading and four planes of images can be updated at −1× reading. In this case, every other data is read at 4× reading. Since an update-rate relationship matches, no problem occurs in reading. FIG. 29 shows a data arrangement pattern obtained with the foregoing items being taken into account.

Figure 30:
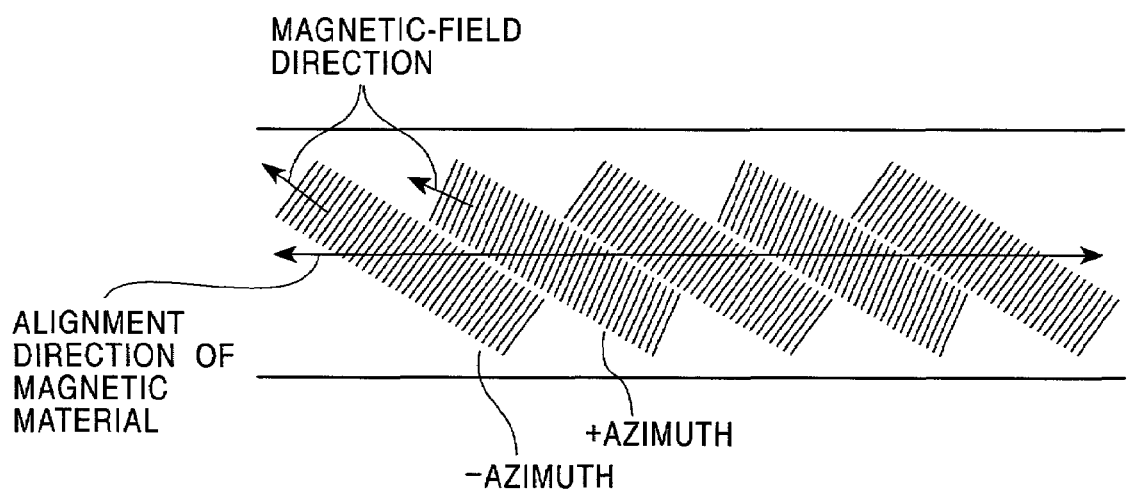
FIG. 30 is a view showing the relationship between the arrangement of a magnetic material and azimuths.

In general, in a recording medium such as a magnetic tape, since a magnetic material is arranged in the longitudinal direction of the tape, as shown in FIG. 30, a reading output differs depending on the angle formed by an azimuth angle during recording and the arrangement of the magnetic material. In the case shown in FIG. 30, since the angle formed by the direction in which the magnetic material is arranged and a recorded magnetic-field direction is smaller at the +azimuth side than at the −azimuth side, a larger reading output is obtained at the +azimuth side than at the −azimuth side. With this feature being used, data for variable-speed reading is recorded at an azimuth side where a larger reading output is obtained. When data for different variable speeds is recorded in both azimuth sides, data for a higher variable speed, in which only a small amount of data is obtained in one scanning and which has an disadvantage in terms of a trace error, is recorded into an azimuth side where a larger reading output is obtained.

Figure 28:
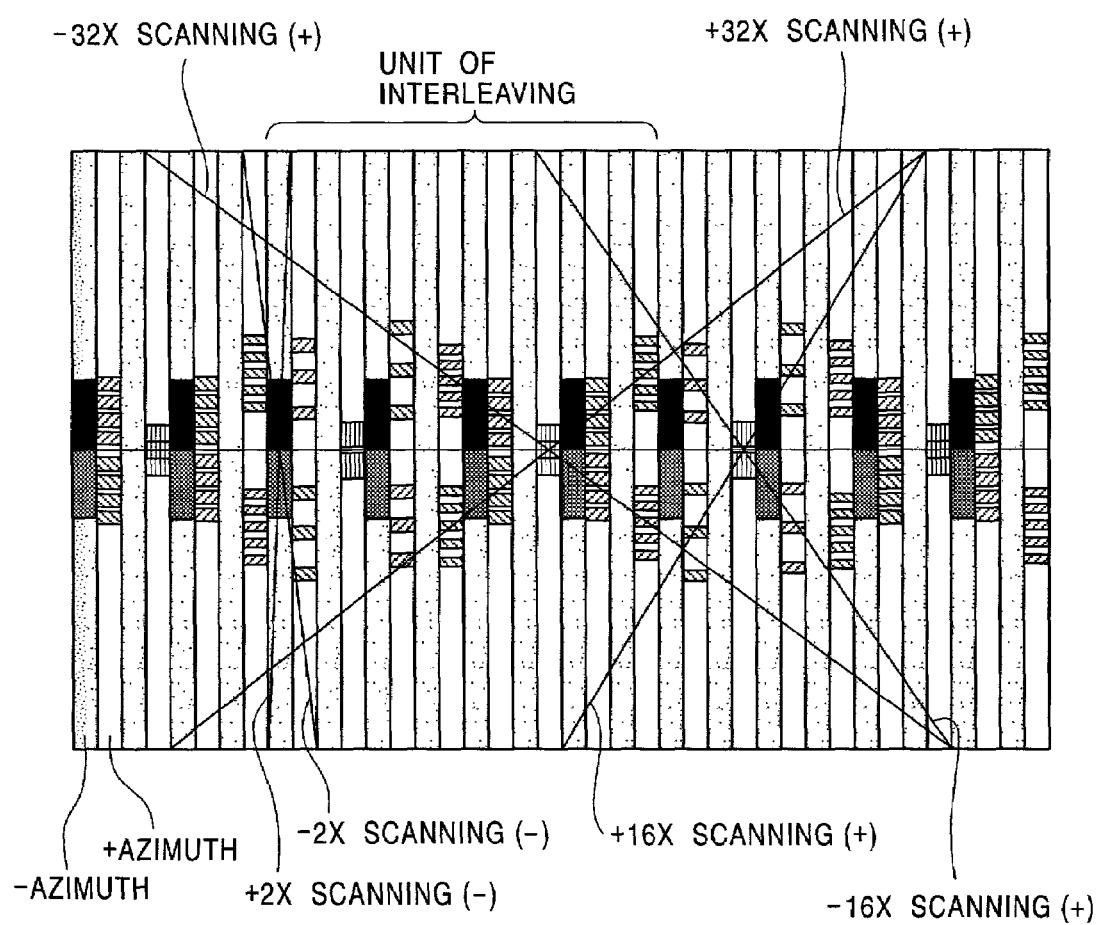
FIG. 28 is a view showing a data arrangement pattern generated with low-speed reading taken into account.

The data arrangements shown in FIG. 28 and FIG. 29 have been generated, with the foregoing items also being taken into account.

Another pattern formed with the foregoing items being taken into account will be further described. Since the items which should be taken into account when patterns are formed have been described above, a description thereof will be omitted and only patterns are shown. The numbers of sync blocks are written in each figure, inclusively.

Figure 31:
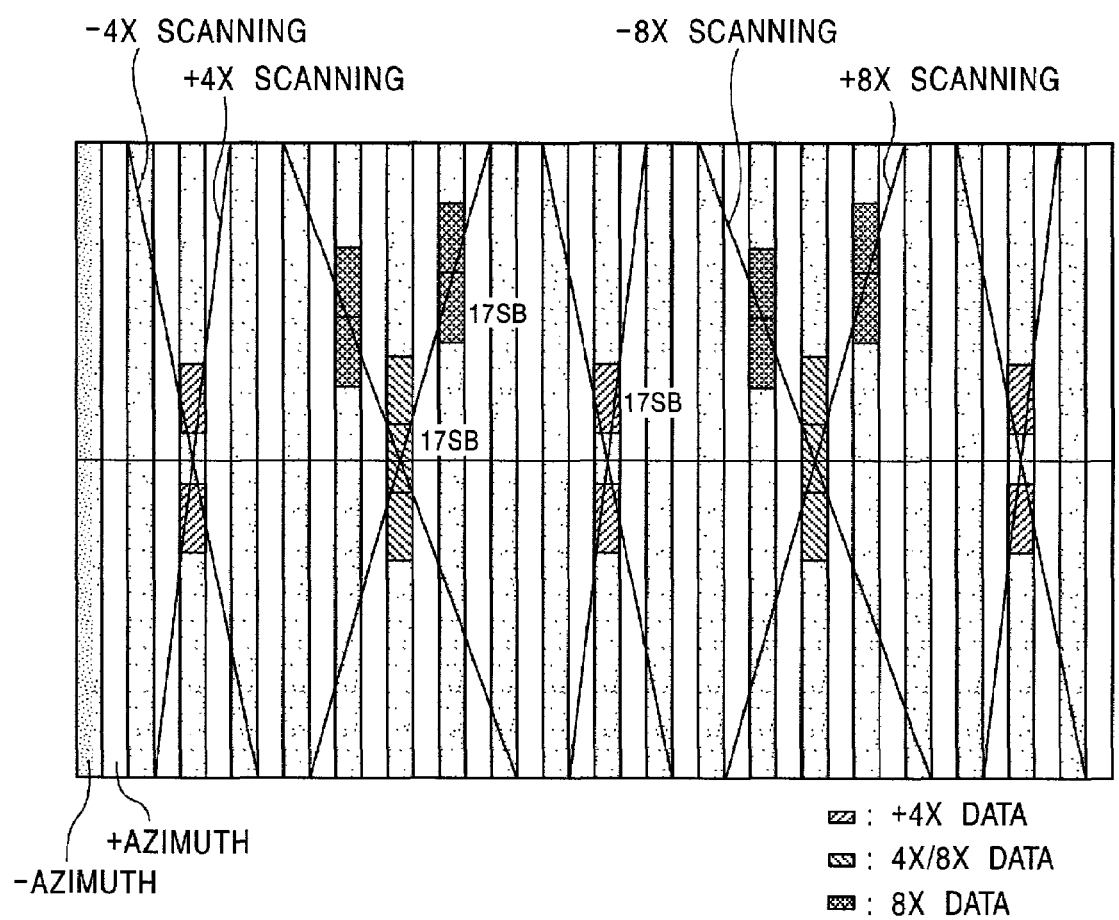
FIG. 31 is a view showing yet another data arrangement pattern of data for 4× reading and 8× reading.

FIG. 31 is a view showing arrangement patterns of data for ±4× reading and ±8× reading. The data for ±4× reading is repeatedly recorded twice, and the data for ±8× reading is repeatedly recorded twice or three times. In one recording operation, data of 17 sync blocks is recorded.

The data for ±8× reading is divided and recorded into three tracks (three tracks recorded with an identical azimuth). Data disposed at the center of the track positioned at the center of the three tracks is used in common in ±8× reading and −8× reading. The data is further used as data for ±4× reading.

Figure 32:
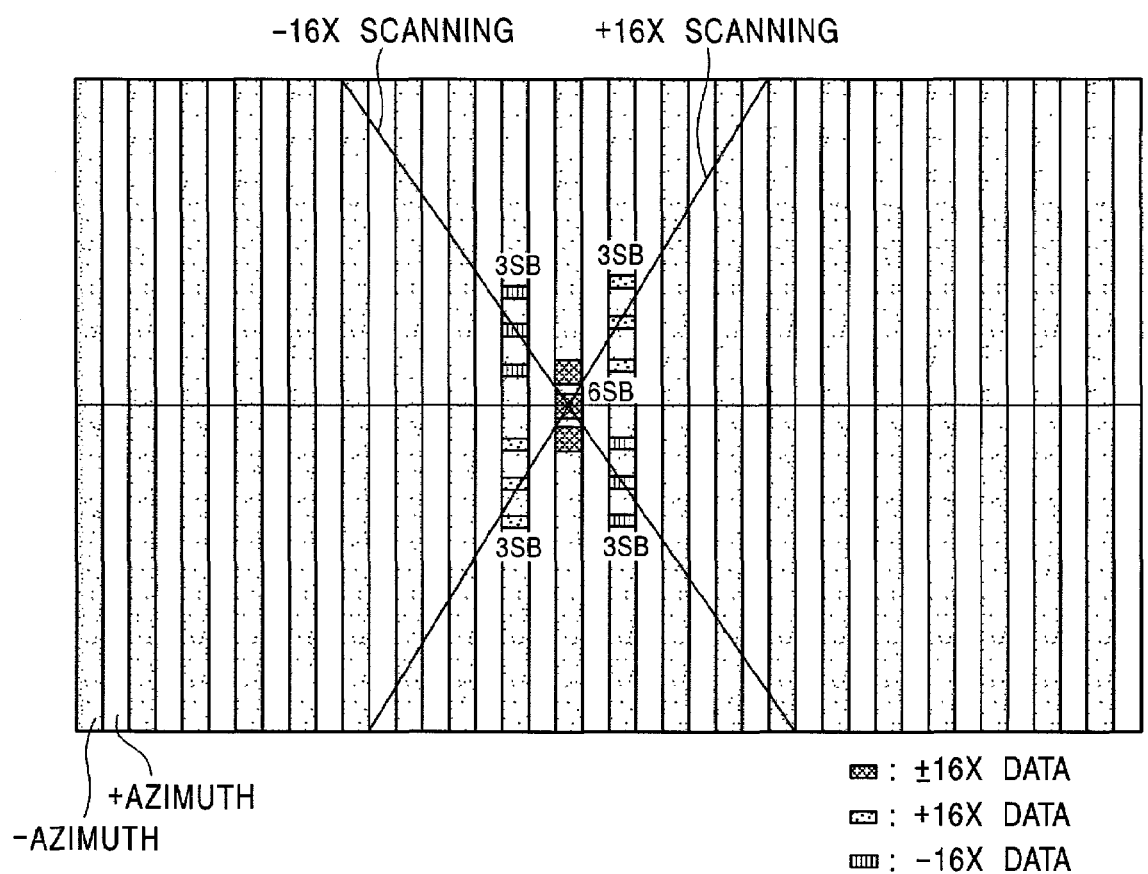
FIG. 32 is a view showing yet another data arrangement pattern of data for 16× reading.

FIG. 32 is a view showing an arrangement pattern of data for ±16× reading. The arrangement pattern shown in FIG. 32 is the same as that of data for ±16× reading shown in FIG. 12 except for the number of sync blocks constituting each data. More specifically, data located at the center and used in common for ±16× reading is formed of six sync blocks, and data in other areas is formed of three sync blocks.

Figure 33:
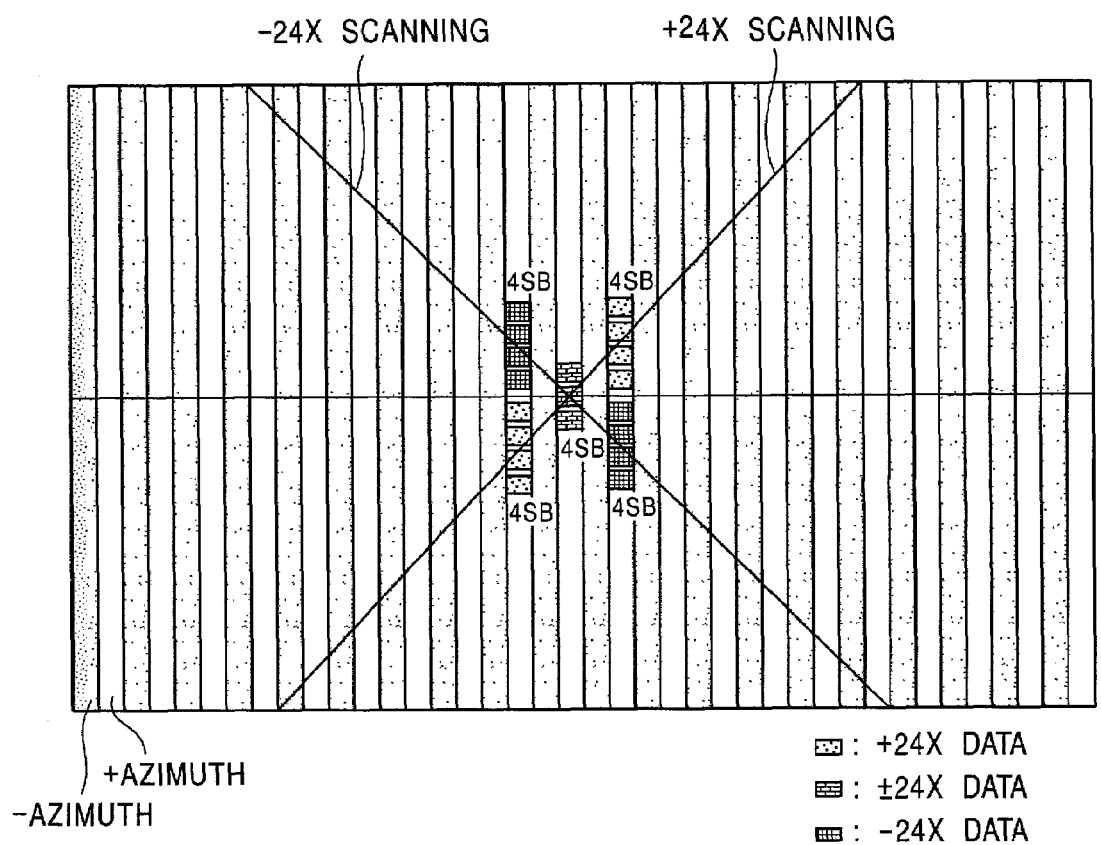
FIG. 33 is a view showing yet another data arrangement pattern of data for 24× reading.

FIG. 33 is a view showing an arrangement pattern of data for ±24× reading. In the arrangement patterns shown in FIG. 33, the data for ±24× reading or the data for −24× reading is recorded in three tracks. Data recorded in the track positioned at the center of the three tracks is used in common in ±24× reading and −24× reading, and repeatedly recorded three times.

Data recorded in the tracks positioned at the right and left of the center track is for ±24× reading or −24× reading, and is repeatedly recorded four times. Each data is formed of four sync blocks.

Figure 34:
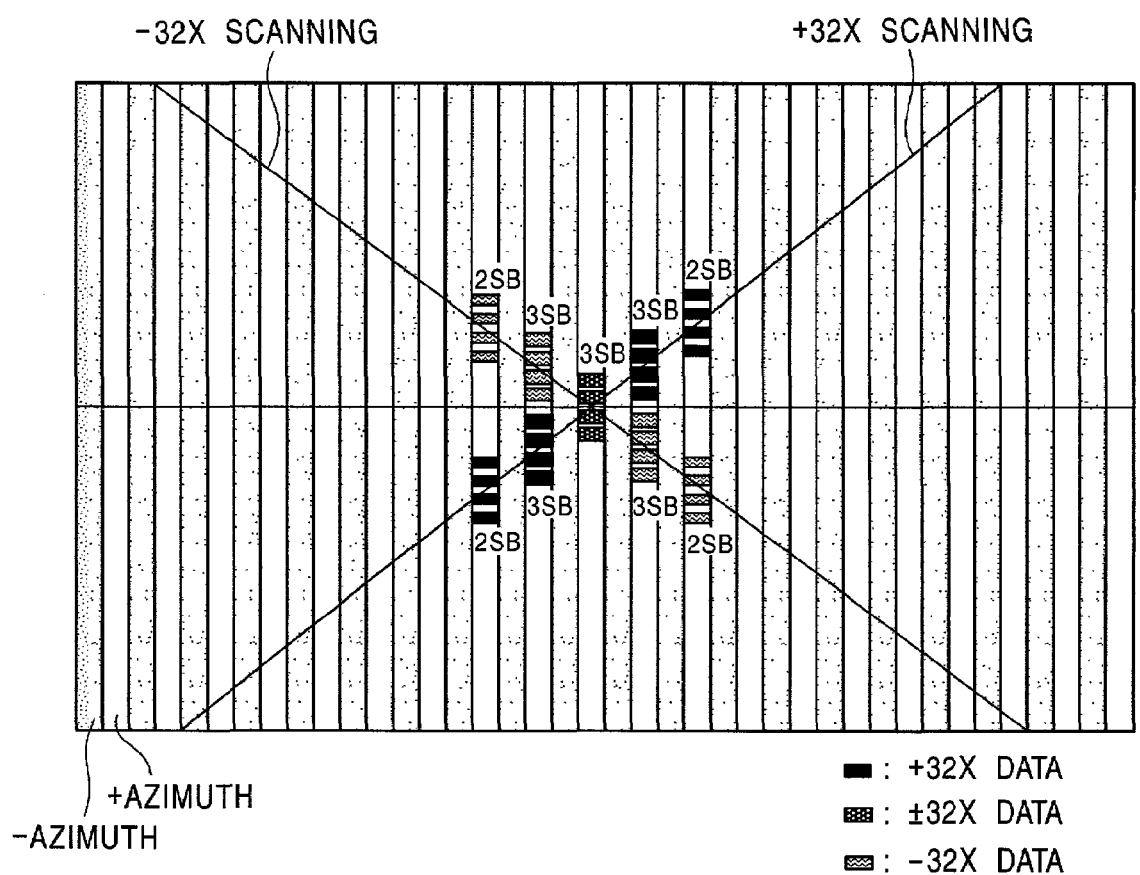
FIG. 34 is a view showing yet another data arrangement pattern of data for 32× reading.

FIG. 34 is a view showing an arrangement pattern of data for ±32× reading. The arrangement pattern shown in FIG. 34 is basically the same as that of data for ±32× reading shown in FIG. 18 except for the number of sync blocks constituting each data. More specifically, data located at the center track and used in common for ±32× reading and data recorded in the track positioned at the right and left of the center track are formed of three sync blocks, and data in other areas is formed of two sync blocks.

Figure 35:
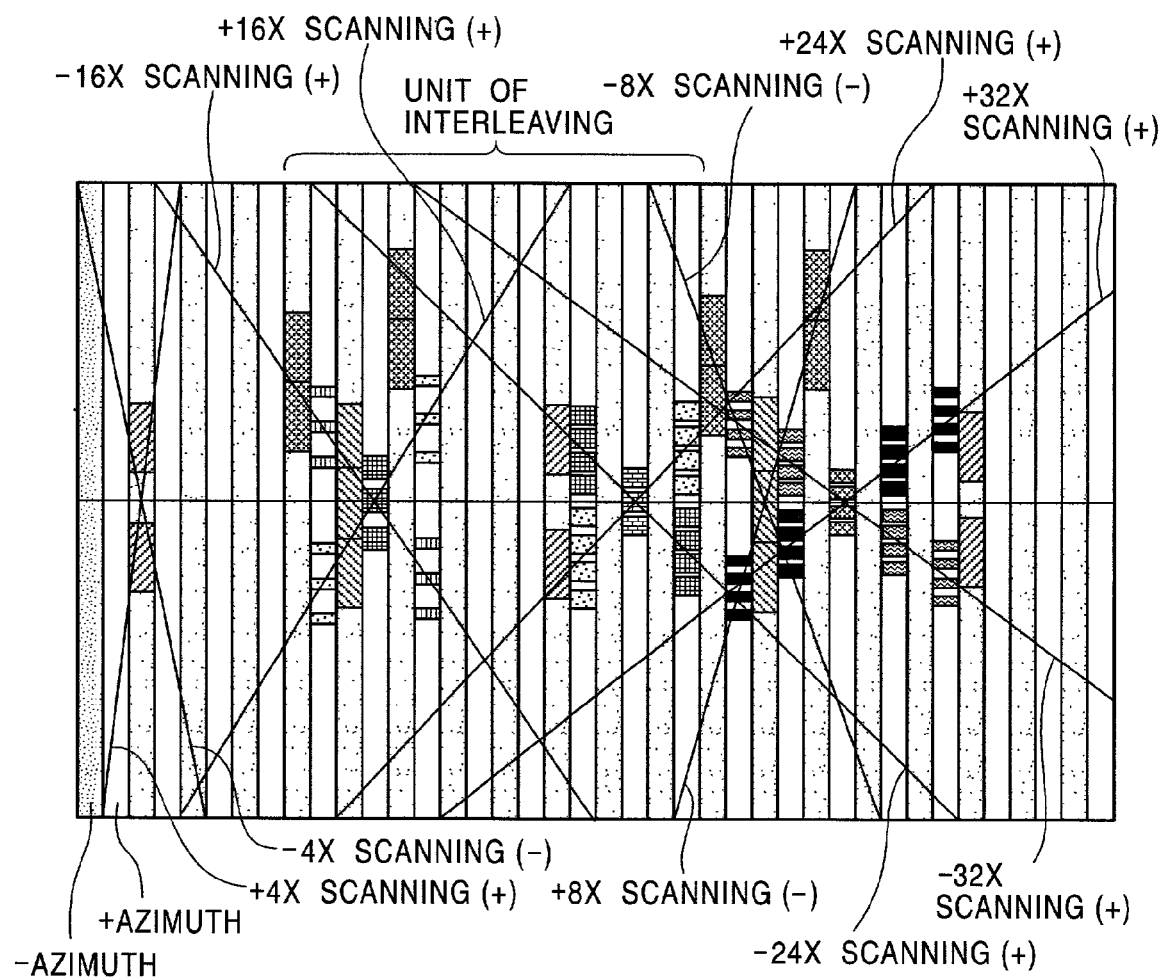
FIG. 35 is a view showing yet another data arrangement pattern generated with interleaving taken into account.

FIG. 35 is a view showing, in one figure, the arrangement patterns of data for ±4× reading, ±8× reading, ±16× reading, ±24× reading, and ±32× reading shown in FIG. 31 to FIG. 34. These arrangement patterns shown in FIG. 35 are formed with a unit of ECC interleaving taken into account. Areas for 4× reading and areas for 8× reading are disposed at positions shown in the figure, with one area for each of 4× and 8× reading being located in one unit of ECC interleaving. The areas for 8× reading include an area used in common for 4× reading.

Areas for 16× reading are disposed at positions shown in the figure, with one area being located in two units of ECC interleaving. Areas for 24× reading are disposed at positions shown in the figure, with one area being located in three units of ECC interleaving. Areas for 32× reading are disposed at positions shown in the figure, with one area being located in four units of ECC interleaving.

When data for variable-speed reading is recorded into a recording medium as described above, even if an RF signal output is reduced at the input end or the output end of a track due to factors of a recording and reproduction apparatus itself, its effect is avoided, and stable data is obtained. A reduction in data capturing rate caused by a trace error is also prevented.

When an arrangement pattern of data for variable-speed reading matches a unit of interleaving for error-correcting outer codes, the scale of hardware (recording and reproduction apparatus) can be made small and a software load can be reduced. When data for low-variable-speed reading is shared, the amount of recorded data is reduced, and thus, an increased recording capacity is used for other data.

When data for high-variable-speed reading, in which only a small amount of data is obtained in one scanning and which has an disadvantage in terms of a trace error, is recorded into a track having a larger reading output, a higher data capturing rate is obtained than in the reverse case.

The series of above-described processing can be executed not only by hardware but also by software. When the series of processing is executed by software, a program constituting the software is installed from a recording medium to a computer built in special hardware or to a general-purpose personal computer which executes various functions when various programs are installed.

Figure 36:
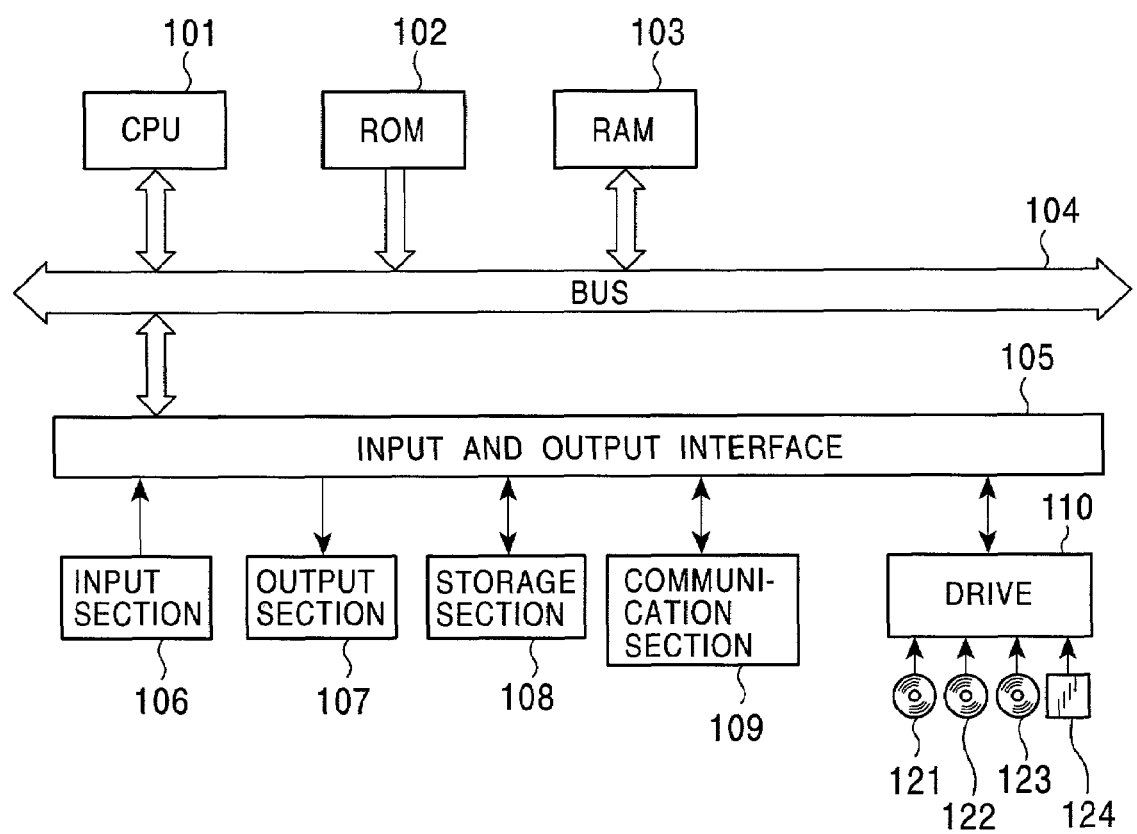
FIG. 36 is a view showing recording media.

FIG. 36 is a view showing an example internal structure of a general-purpose personal computer. A central processing unit (CPU) 101 of the personal computer executes various types of processing according to programs stored in a ROM (read-only memory) 102. A RAM (random-access memory) 103 stores data and programs required for the CPU 101 to executes various types of processing. An input and output interface 105 is connected to an input section 106 formed of a keyboard and a mouse, and outputs a signal input to the input section 106 to the CPU 101. The input and output interface 105 is also connected to an output section 107 formed of a display unit and a speaker.

The input and output interface 105 is further connected to a storage section 108 formed of a hard disk, and to a communication section 109 for sending and receiving data to and from other apparatuses through a network such as the Internet. A drive 110 reads data from or writes data into recording media, such as a magnetic disk 121, an optical disk 122, a magneto-optical disk 123, and a semiconductor memory 124.

As shown in FIG. 36, the recording media includes not only package media which are distributed separately from the computer to the users for providing programs and which store the programs, such as the magnetic disk 121 (including a floppy disk), the optical disk 122 (including a compact disc-read only memory (CD-ROM) and a digital versatile disk (DVD)), the magneto-optical disk 123 (including a Mini disk (MD)) and the semiconductor memory 124, but also the ROM 102 and the storage section 108, which are built in the computer in advance and provided for the users and which store the programs.

In the present specification, steps describing the programs stored in a recording medium include not only processes executed in a time-sequential manner in the described order, but also those not necessarily executed in a time-sequential manner but executed in parallel or independently.

What is claimed is:

1. A magnetic-tape recording apparatus for recording digital image data into a track on a magnetic tape by a rotating head, comprising:
    inputting means for inputting the digital image data;
    extracting means for extracting digital image data for variable-speed reading, from the digital image data input by the inputting means; and
    recording means for recording digital image data extracted by the extracting means in a distribution manner into a first area positioned at almost the center of the track and a second area to be traced during variable-speed reading, positioned in a track located in the vicinity of the track which includes the first area,
    wherein the recording means records digital image data to be recorded into each of the first area and the second area, into each area a plurality of times.

2. A magnetic-tape recording apparatus according to claim 1, wherein digital image data recorded into the first area is digital image data read in common in variable-speed reading in the positive direction and in variable-speed reading in the reverse direction.

3. A magnetic-tape recording apparatus according to claim 1, wherein the recording means sets a predetermined number of tracks to one group, and records the digital image data extracted by the extracting means into each of the first area and the second area according to a predetermined pattern in each group.

4. A magnetic-tape recording apparatus according to claim 1, wherein the recording means records the digital image data extracted by the extracting means into the magnetic tape by a rotating head having an azimuth which is determined to have a recording magnetization direction close to the arrangement direction of a magnetic material applied to the magnetic tape.

5. A magnetic-tape recording apparatus according to claim 1,
    wherein, when the digital image data extracted by the extracting means is recorded into tracks having both azimuths, the recording means records digital image data for a larger-times-faster reading into a track with an azimuth having a recording magnetization direction closer to the arrangement direction of a magnetic material applied to the magnetic tape, and records digital image data for a smaller-times-faster reading into the other track.

6. A magnetic-tape recording apparatus according to claim 1,
    wherein the recording means generates digital image data for n-times-faster reading, and arranges and records the digital image data at almost the center of each track at an interval of n tracks or 2n tracks, where n is a power of 2, and the arranged digital image data is used during m-times-faster variable-speed reading in the positive direction and in the reverse direction, where m is a power of 2, and during normal-speed reading in the reverse direction.

7. A magnetic-tape recording apparatus according to claim 6, wherein n and m satisfy the relationship of m<n.

8. A magnetic-tape recording apparatus according to claim 1,
    wherein the digital image data is formed of a sync block having a predetermined length; and
    wherein the recording means records the digital image data into each area the plurality of times, with an area corresponding to (L–N) sync blocks being disposed between the data, where N indicates the number of sync blocks to be recorded into the first area or the second area, and L indicates the number of sync blocks which can be captured in the first area and the second area.

9. A magnetic-tape recording apparatus according to claim 1,
    wherein the recording means specifies one location as a trace target of phase lock servo, arranges the digital image data at the location and at locations positioned therebefore and thereafter where data can be captured, and records the same digital image data the plurality of times such that the value of (L–N) becomes larger as the head is farther from the trace target.

10. A magnetic-tape recording method for a magnetic-tape recording apparatus for recording digital image data into a track on a magnetic tape by a rotating head, comprising:
    an input control step of controlling the input of the digital image data;
    an extracting step of extracting digital image data for variable-speed reading, from the digital image data input by a process in the input control step; and
    a recording control step for controlling such that digital image data extracted by the process in the extracting step is recorded in a distribution manner into a first area positioned at almost the center of the track and a second area to be traced during variable-speed reading, positioned in a track located in the vicinity of the track which includes the first area, wherein digital image data to be recorded into each of the first area and the second area, is recorded into each area a plurality of times.

11. A recording medium storing a computer-readable program for a magnetic-tape recording apparatus for recording digital image data into a track on a magnetic tape by a rotating head, the program comprising:

an input control step of controlling the input of the digital image data;

an extracting step of extracting digital image data for variable-speed reading, from the digital image data input by a process in the input control step; and a recording control step for controlling such that digital image data extracted by the process in the extracting step is recorded in a distribution manner into a first area positioned at almost the center of the track and a second area to be traced during variable-speed reading, positioned in a track located in the vicinity of the track which includes the first area, wherein the digital image data to be recorded into each of the first area and the second area is recorded into each area a plurality of times.

12. A magnetic tape, comprising:

digital image data for variable-speed reading is recorded in a distribution manner into a first area positioned at almost the center of a track and a second area to be traced during variable speed reading, positioned in a tack located in the vicinity of the track which includes the first area, wherein the digital image data recorded into each of the first and second areas is recorded into each area a plurality of times, and at least one sync block is recorded, which is utilized to perform tracking of the digital image data recorded in a reproduction operation of the magnetic tape.

* * * * *